United States Patent [19]

Ozeki et al.

[11] Patent Number: 5,986,732
[45] Date of Patent: Nov. 16, 1999

[54] COLOR LIQUID CRYSTAL DISPLAY APPARATUS

[75] Inventors: Masao Ozeki; Haruki Mori; Eiji Shidoji, all of Yokohama, Japan

[73] Assignee: Asahi Glass Company Ltd., Tokyo, Japan

[21] Appl. No.: 08/704,770

[22] PCT Filed: Jan. 22, 1996

[86] PCT No.: PCT/JP96/00101

§ 371 Date: Sep. 23, 1996

§ 102(e) Date: Sep. 23, 1996

[87] PCT Pub. No.: WO96/23244

PCT Pub. Date: Aug. 1, 1996

[30] Foreign Application Priority Data

| Jan. 23, 1995 | [JP] | Japan | 7-008494 |
| Feb. 8, 1995 | [JP] | Japan | 7-020774 |
| Feb. 23, 1995 | [JP] | Japan | 7-035697 |

[51] Int. Cl.$^6$ .......... G02F 1/1335; G02F 1/1333
[52] U.S. Cl. .......... 349/118; 349/99; 349/121; 349/50
[58] Field of Search .......... 349/118, 121, 349/99; 345/50, 52

[56] References Cited

U.S. PATENT DOCUMENTS

| 4,697,884 | 10/1987 | Amstutz et al. . |
| 5,194,975 | 3/1993 | Akatsuka et al. . |
| 5,227,903 | 7/1993 | Miyazawa et al. .......... 349/118 |

(List continued on next page.)

FOREIGN PATENT DOCUMENTS

| 2-118516 | 5/1990 | Japan . |
| 2-183220 | 7/1990 | Japan . |
| 6-175125 | 6/1994 | Japan . |
| 6-301006 | 10/1994 | Japan . |
| 6-301026 | 10/1994 | Japan . |
| 6-337397 | 12/1994 | Japan . |
| 0 0740 181 | 10/1996 | United Kingdom . |
| WO 96/13752 | 9/1996 | WIPO . |

OTHER PUBLICATIONS

REC Mode for Reflective Color STN–LCD by Seiko Epson (6 pages), Iijma, pp. 171–176.

*Primary Examiner*—William L. Sikes
*Assistant Examiner*—Toan Ton
*Attorney, Agent, or Firm*—Oblon, Spivak, McClelland, Maier & Neustadt, P.C.

[57] ABSTRACT

A color liquid crystal display device has a liquid crystal layer of nematic liquid crystal having positive dielectric anisotropy and including a chiral material, which is interposed between two substrates disposed substantially in parallel, each provided with a transparent electrode and an aligning layer. The twist angle of the liquid crystal layer of liquid crystal molecules determined by the aligning layer of each of the substrates is 160°–300°. A pair of polarizing plates are disposed outside the liquid crystal layer. A driving circuit applies a driving voltage across the transparent electrodes. A birefringent plate is disposed between the liquid crystal layer and an upper polarizing plate and the product $\Delta n_1 \cdot d_1$ of the refractive index anisotropy $\Delta n_1$ of the liquid crystal in the liquid crystal layer and the thickness $d_1$ of the liquid crystal layer is 1.2 μm–2.5 μm. The birefringent plate is formed to have a relation of $n_X \geq n_Z \geq n_Y$, wherein $n_X$ and $n_Y$ respectively represent the refractive index ($n_X \geq n_Y$) in a film plane direction of the birefringent plate, and $n_Z$ represents the refractive index in the thickness direction of the birefringent plate (except for a case of $n_X = n_Z = n_Y$). The birefringent plate has the sum $\Delta n_2 \cdot d_2$ of the refractive index anisotropy between a slow axis (a direction of $n_X$ in the film plane) and a fast axis (a direction of $n_Y$ in the film plane), and birefringence in the thickness direction is 1.2 μm–2.5 μm. At least three voltage values are selected to be applied across the transparent electrodes by multiplexing driving and development of a white color is effected by applying an OFF voltage.

21 Claims, 21 Drawing Sheets

U.S. PATENT DOCUMENTS

| | | |
|---|---|---|
| 5,369,513 | 11/1994 | Akatsuka et al. . |
| 5,406,396 | 4/1995 | Akatsuka et al. . |
| 5,523,867 | 6/1996 | Akatsuka et al. . |
| 5,559,618 | 9/1996 | Mori ........................................ 349/118 |
| 5,583,678 | 12/1996 | Nishino et al. . |
| 5,585,950 | 12/1996 | Nishino et al. .......................... 349/118 |
| 5,650,833 | 7/1997 | Akatsuka et al. ........................ 349/118 |
| 5,724,112 | 3/1998 | Yoshida et al. .......................... 349/117 |
| 5,745,204 | 4/1998 | Hoshino . |
| 5,796,378 | 8/1998 | Yoshida et al. . |
| 5,838,408 | 11/1998 | Inoue et al. . |

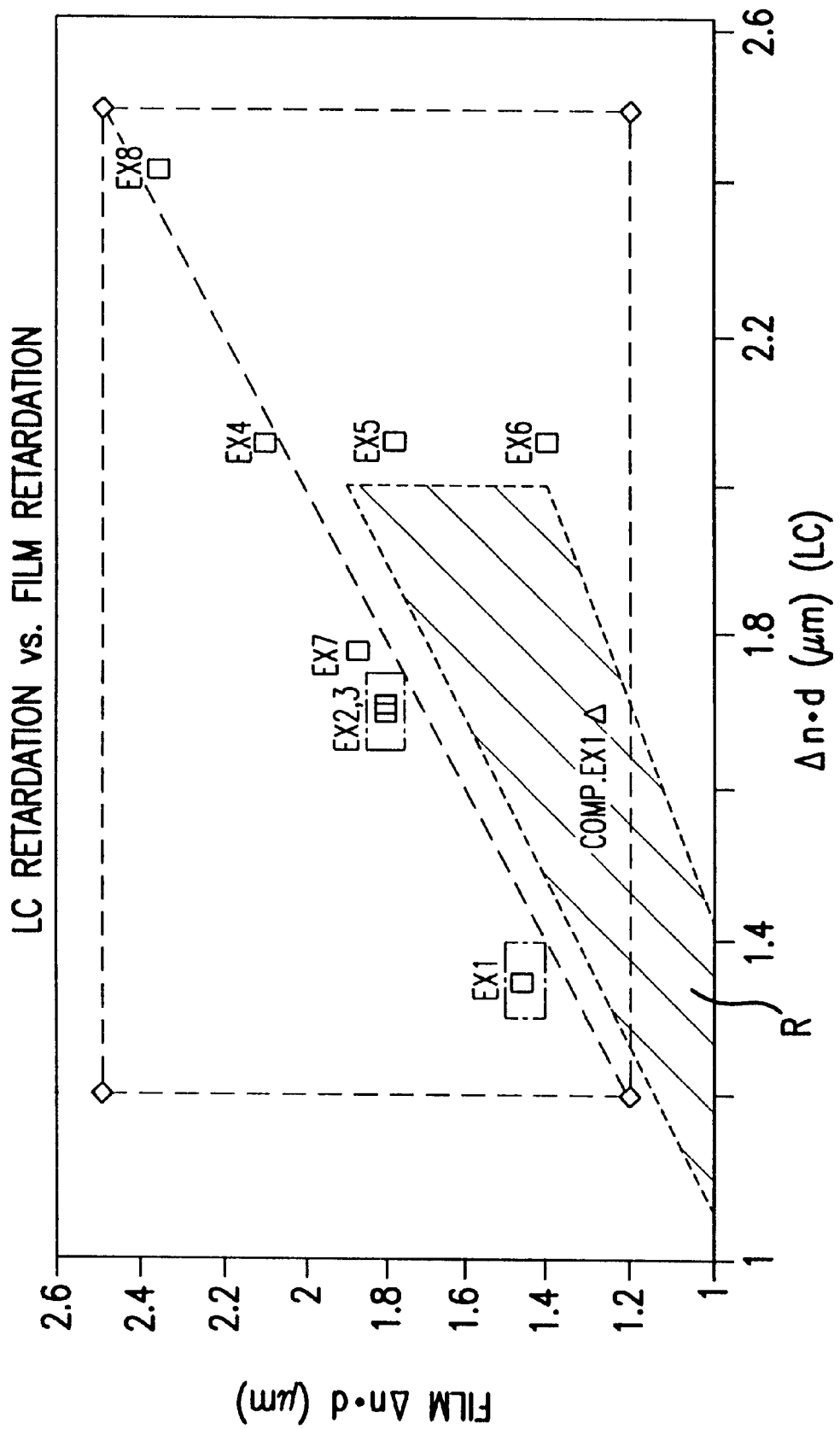

COLOR LIQUID CRYSTAL DISPLAY APPARATUS

BACKGROUND OF THE INVENTION

Field of the Invention

The present invention relates to a color liquid crystal display apparatus suitable for displaying an achromatic color by using a twisted nematic liquid crystal and capable of displaying each color of red, blue and green.

DISCUSSION OF THE BACKGROUND

There has been known a super-twisted element for a method of obtaining a high density dot matrix display by increasing a twist angle of liquid crystal molecules between a pair of electrodes to thereby cause a sharp change of voltage-transmittance characteristics (T. J. Scheffer and J. Nehring, Appl. Phycs. Lett. 45(10)1021–1023(1984).

In the conventional method, however, the product $\Delta n \cdot d$ of the refractive index $\Delta n$ of liquid crystal in a liquid crystal display element used and the thickness d of a liquid crystal layer was substantially in a range of 0.8 $\mu m$–1.2 $\mu m$ (Japanese Unexamined Patent Publication No. 10720/1985 which is referred to as conventional technique 1). According to the conventional technique, an excellent contrast could be obtained only by a specified combination of colors such as yellowish green and dark blue, bluish purple and pale yellow and so on.

Thus, in the conventional technique using such a liquid crystal display element, a monochrome display could not be effected. In order to improve the conventional technique, there was proposed a liquid crystal display apparatus capable of displaying a monochrome display and having a high contrast ratio wherein two liquid crystal cells of different helical structures are placed one on another; a voltage is applied to either cell and the other is merely used as an optically compensating plate (Report of Television Association 11 (27), p. 79 (1987) by Okumura et al.).

Also, there was proposed a method of providing a monochrome display by arranging a birefringent plate between the liquid crystal layer and a polarizing plate. Conventionally, a color liquid crystal display apparatus used for OA machines such as personal computers comprised the above-mentioned liquid crystal display element capable of effecting a monochrome display and color filters.

However, the color filters are expensive and have extremely low efficiency of utilization of light since a display is effected with three picture elements of red, blue and green. For instance, three picture elements of red, blue and green are used for displaying white, and even when the three picture elements are turned on, the brightness is ⅓ and accordingly, a bright display can not be obtained.

Several techniques have been proposed for color display apparatuses without having color filters. For instance, an electrically controlled birefringence (ECB) effect type liquid crystal display apparatus is known. In this apparatus, when gradation voltages (e.g., voltages for 8 gradations) are applied to a pixel, the orientation of liquid crystal molecules is changed depending on gradation voltages applied whereby $\Delta n \cdot d$ of the liquid crystal cells is changed. And various colors caused by the effect of the birefringence in the liquid crystal cell are used. In such an ECB effect type liquid crystal display apparatus, however, since liquid crystal is not have a twisted structure, a state of liquid crystal to be changed depending on an applied voltage was small, and a display by multiplexing driving could not be obtained.

Japanese Unexamined Patent Publication No. 118516/1990 (conventional technique 2) discloses that various colors can be displayed by changing a voltage applied to a cell including twisted liquid crystal molecules. In this conventional technique 2, however, there is a problem that colors which can be developed are yellow, red, purple, bluish purple, bluish green and green, and a display of achromatic color such as black or white is impossible. It has been known that the visibility in usually used displays is considerably reduced if a display of black or white is not used. For instance, in a display of graphs, achromatic color of black or white is often chosen as a background color. Since the background color occupies a broader surface area in display, it is difficult to obtain a non-stimulative display when a color other than a monochrome color, such as yellow or green, is used for the background color. As the basic of display, an expression with a line of black color on a white ground such as a letter or letters in black on a white paper, and such type of display is usually used. It is preferable to provide a display in blue, green and/or red in addition to a white/black display. Accordingly, a display apparatus which can not provide a white/black display lacks visibility.

The conventional technique 2 discloses that two layered structures using a compensation cell can provide a monochrome display. In this conventional technique, however, color development is achieved by applying a voltage to the compensation cell so that the compensationed cell does not function in an optical sense. Accordingly, in the display apparatus to be operated by multiplexing driving, it is impossible to mix a color of blue or green with white or black.

Japanese Unexamined Patent Publication No. 183220/1990 (conventional technique 3) discloses that pixels are formed in a compensation cell to provide a display, and a color of blue or green can be provided along with black or white when the display apparatus is operated by multiplexing driving. However, each of the pixels in the two cells in the liquid crystal panel has to be formed in a one to one relation. In this case, the manufacture of the liquid crystal panel is difficult. Further, when the panel is watched from an oblique direction, mixing of color is observed due to an azimuth difference. The conventional technique is insufficient to provide a display of quality and being practically usable. Further, the liquid crystal panel of double layered structure increases the weight; it is difficult to control the gap in the liquid crystal cells, and yield of manufacture is further decreased.

Japanese Unexamined Patent Publication No. 175125/1994 (conventional technique 4) discloses that an improvement of color can be obtained by using a phase difference plate. The claimed region of the conventional technique 4 is shown in FIG. 28 (hatching area). However, this publication does not disclose a display of achromatic color (white or black).

Japanese Unexamined Patent Publication No. 301006/1994 (conventional technique 5) discloses in some embodiment that it is possible to display colors of blue, green, white and red. However, this conventional technique is so adapted that a display of blue color is provided when an applied voltage is low and a white color is developed when the applied voltage is increased. Accordingly, when lattice-like matrix driving is effected and if spaces between driving electrodes are blue, a generally blue display is provided even though the color of pixels is white, and white having good color purity can not be developed. Accordingly, it is preferable that the spaces between lines is of achromatic color. Namely, it is preferable that the spaces are substantially of achromatic color unless the voltage is applied. Further, when an achromatic color is to be presented by applying a voltage of intermediate tone, a slight change of voltage causes a change of color in a display since liquid crystal molecules to which an intermediate voltage is applied show a sudden change with a slight change of voltage. Accordingly, a beautiful display of achromatic color can not be obtained.

The same situation is applicable to a case that colors which are developed by applying intermediate voltages are used in the whole area of picture display. Generally, an achromatic color is used for the background color. In this case, the area of achromatic color occupies a large surface area. When the color occupying such a large surface area is deteriorated, the quality of display is considerably reduced. Accordingly, it is desirable to avoid the development of the achromatic color at an intermediate voltage in order to obtain a uniform color.

In consideration of the above-mentioned problems, it is preferable that a display of the achromatic color can be obtained when no voltage is applied or an OFF waveform is formed in multiplexing driving.

In Example 5 of the conventional technique 5, there is a description that a display of white, blue and green is possible. However, it also discloses that an applied voltage for developing white is 0.2 V or less, an applied voltage for developing blue is 1.3 V–2.2 V and an applied voltage for developing green is 3.0 V or more. In the conventional technique 5, it is apparently difficult to effect multiplexing driving. The driving voltages as described in Example 5 can be used only for a specified purpose of use.

Embodiment 6 in Japanese Unexamined Patent Publication No. 301026/1994 (conventional technique 6) describes that a white display can be obtained with 0.9 V or 1.6 V or less. However, a large duty ratio can not be utilized for multiplexing driving when a display of green, red or blue is to be presented.

An embodiment in Japanese Unexamined Patent Publication No. 337397/1994 (conventional technique 7) describes that a white display is obtained when an OFF waveform is formed. However, the conventional technique 7 can not provide a display of red.

In the June 1994 issue of Nikkei Microdevices, pages 34–39, a reflection type color liquid crystal display having white development is introduced.

A White-Red-Blue-Green color development is shown in FIG. 5 in page 38 of this magazine.

SUMMARY OF THE INVENTION

It is an object of the present invention to provide a color liquid crystal display apparatus which allows multiplexing driving; exhibits a bright white display by applying an OFF waveform, and develops a color of blue or green or red without using color filters when an ON waveform or an intermediate voltage between the ON waveform and the OFF waveform is applied. In other words, the object of the present invention is to provide a color liquid crystal display apparatus capable of providing a display of substantially achromatic color when no voltage is applied or an applied voltage is low; capable of realizing a color display by applying a voltage, and having a wide viewing angle.

The inventors of this application actually manufactured the liquid crystal display apparatus of the present invention, and they confirmed the achievement of the present invention by using a simulator of liquid crystal device, which is widely used for calculating the optical characteristics of liquid crystal and which is called the 4×4 matrix method by Berreman. In this method of calculation, first, a state of orientation of liquid crystal to which a voltage is applied is obtained by calculation. Then, optical members such as liquid crystal, compensation films, polarizing plates and so on are divided into a plurality of layers of appropriate thickness, and the local propagation matrix is calculated for each of the divided layers.

Then, the values of the local propagation matrix of each of the layers are multiplied to obtain the propagation matrix of the all optical members. Thereafter, the reflection light and the transmitting light of incident light are calculated by using the propagation matrix.

The transmittance and the reflectance of lights of various wavelengths can be calculated by using the 4×4 matrix method by Berreman. By using this method, the luminous transmittance and the luminous reflectance could be calculated, and x values and y values of chromaticity coordinates for the color liquid crystal display apparatus of the present invention could be calculated quickly and accurately.

The 4×4 matrix method by Berreman is known as a technique capable of beautifully reproducing experimental results by numerical calculations. The inventors compared the experimental results of examples of the present invention with values obtained by numerical calculations, and confirmed that the experimental results and the values obtained by numerical calculations substantially agreed in the range of effective precision.

An actually used LCD has an ITO, a glass substrate or a spacer for a gap control which has a finite transmittance and wavelength characteristics. In consideration of influence by these elements, the transmittance vs applied voltage characteristics obtained by calculations well reproduced the experimental results.

Further, a result of calculation of the chromaticity substantially corresponds to the experimental results. Accordingly, calculations by the Berreman's 4×4 matrix method can be used for actual experiments.

There is provided a color liquid crystal display device comprising a liquid crystal layer of a nematic liquid crystal having positive dielectric anisotropy and including a chiral material, which is interposed between two substrates disposed substantially in parallel to each other, each provided with a transparent electrode and an aligning layer wherein the twist angle of the liquid crystal layer by the orientation of liquid crystal molecules determined by the aligning layer of each of the substrates is 160°–300°; a pair of polarizing plates disposed outside the liquid crystal layer, and a driving circuit for applying a driving voltage across the transparent electrodes, wherein a birefringent plate is disposed between the liquid crystal layer and either one of the pair of polarizing plates; in the two substrates, the substrate adjacent to the the birefringent plate is the first substrate and the other is the second substrate, and the product $\Delta n_1 \cdot d_1$ of the refractive index anisotropy $\Delta n_1$ of the liquid crystal in the liquid crystal layer and the thickness $d_1$ of the liquid crystal layer is 1.2 $\mu$m–2.5 $\mu$m; the birefringent plate is so formed as to have a relation of $n_X \geq n_Z \geq n_Y$ wherein $n_X$ and $n_Y$ respectively represent the refractive index ($n_X > n_Y$) in the direction of film plane of the birefringent plate, and $n_Z$ represents the refractive index in the direction of thickness of the birefringent plate (except for a case of $n_X = n_Z = n_Y$); in the birefringent plate, the sum $\Delta n_2 \cdot d_2$ of the refractive index anisotropy between a slow axis (a direction of $n_X$ in the film plane) and a fast axis (a direction of $n_Y$ in the film plane), and the birefringence in the vertical direction corresponding to the thickness is 1.2 μm–2.5 μm; at least three kinds of voltage values are selected so as to be applied across the transparent electrodes by multiplexing driving; and development of color of white is effected by applying an OFF voltage or zero voltage. The invention is referred to as the first invention.

In the first invention, $n_X > n_Z > n_Y$ implies use of a biaxial birefringent plate. $n_X = n_Z > n_Y$ or $n_X > n_Z = n_Y$ implies use of a uniaxial birefringent plate.

There is provided a color liquid crystal display apparatus according to the first invention, wherein the twist angle of the liquid crystal layer is 160°–260°; an angle $\theta_2$ formed by the slow axis and the orientation of liquid crystal molecules at the first substrate side is 75°–110°; an angle $\theta_1$ formed by the polarizing axis or he absorbing axis of the polarizing plate at the first substrate side and the orientation of the above-mentioned liquid crystal molecules is 120°–165°; and an angle $\theta_3$ formed by the polarizing axis or the absorbing axis of the polarizing plate at the second substrate side and the orientation of liquid crystal molecules at the second substrate side is 115°–155°. The invention is referred to as the second invention.

There is provided a color liquid crystal display apparatus according to the first invention or the second invention, wherein the twist angle of the liquid crystal layer is 220°–260°. The invention is referred to as the third invention.

There is provided a liquid crystal display apparatus according to any one of the first through third inventions, wherein a relation of $\Delta n_1 \cdot d_1 \leq \Delta n_2 \cdot d_2$ is satisfied. Further, a relation of $\Delta n_1 * d_1 \leq \Delta n_2 \cdot d_2 \leq \Delta n_1 \cdot d_1 * 1.2$ is preferred. The invention is referred to as the fourth invention.

There is provided a color liquid crystal display apparatus according to any one of the first through the fourth inventions, wherein the twist angle of the liquid crystal layer is 220°–260°, $\Delta n_1 \cdot d_1$ is 1.3 μm–1.8 μm and $\Delta n_2 \cdot d_2$ is 1.4 μm–1.9 μm; the angle $\theta_2$ formed by the slow axis and the orientation of liquid crystal molecules at the first substrate side is 75°–110°; the angle $\theta_1$ formed by the polarizing axis or the absorbing axis of the polarizing plate at the first substrate side and the orientation of the above-mentioned liquid crystal molecules is 120°–165°, and the angle $\theta_3$ formed by the polarizing axis or the absorbing axis of the polarizing plate at the second substrate side and the orientation of liquid crystal molecules at the second substrate side is 120°–150°. The invention is referred to as the fifth invention.

There is provided a color liquid crystal display apparatus according to any one of the first through fifth inventions, wherein when values of $\Delta n_1 \cdot d_1$ and $\Delta n_2 \cdot d_2$ used in combination are expressed by vectors of ($\Delta n_1 \cdot d_1$ and $\Delta n_2 \cdot d_2$), $\Delta n_1 \cdot d_1$ and $\Delta n_2 \cdot d_2$ are selected from a region surrounded by $L_1$ (1.3, 1.4), $L_2$ (1.4, 1.4), $L_3$ (1.3, 1.5), $L_4$ (1.75, 1.75), $L_5$ (1.75, 1.85) and $L_6$ (1.65, 1.85). The invention is referred to as the sixth invention.

There is provided a color liquid crystal display apparatus according to the first through third inventions, wherein the twist angle of the liquid crystal layer is 230°–250°, $\Delta n_1 \cdot d_1$ is 1.3 μm–1.4 μm and $\Delta n_2 \cdot d_2$ is 1.4 μm–1.5 μm; the angle $\theta_2$ formed by the axis of lagging phase and the orientation of liquid crystal molecules at the first substrate side is 90°–110°; the angle $\theta_1$ formed by the polarizing axis or the absorbing axis of the polarizing plate at the first substrate side and the orientation of the above-mentioned liquid crystal molecules is 130°–150°, and the angle $\theta_3$ formed by the polarizing axis or the absorbing axis of the polarizing plate at the second substrate side and the orientation of liquid crystal molecules at the second substrate side is 125°–145°. The invention is referred to as the seventh invention.

There is provided a color liquid crystal display apparatus according to any one of the first through third inventions, wherein the twist angle of the liquid crystal layer is 230°–250°, $\Delta n_1 \cdot d_1$ is 1.65 μm–1.75 μm and $\Delta n_2 \cdot d_2$ is 1.75 μm–1.85 μm; the angle $\theta_2$ formed by the slow axis and the orientation of liquid crystal molecules at the first substrate side is 85°–105°; the angle $\theta_1$ formed by the polarizing axis or the absorbing axis of the polarizing plate at the first substrate side and the orientation of the above-mentioned liquid crystal molecules is 140°–160°, and the angle $\theta_3$ formed by the polarizing axis or the absorbing axis of the polarizing plate at the second substrate side and the orientation of liquid crystal molecules at the second substrate side is 125°–145°. The invention is referred to as the eighth invention.

There is provided a color liquid crystal display apparatus according to any one of the first through fourth inventions, wherein the twist angle of the liquid crystal layer is 230°–250°, $\Delta n_1 \cdot d_1$ is 1.9 μm–2.1 μm and $\Delta n_2 \cdot d_2$ is 2.0 μm–2.2 μm;

the angle $\theta_2$ formed by the slow axis and the orientation of liquid crystal molecules at the first substrate side is 85°–105°; the angle $\theta_1$ formed by the polarizing axis or the absorbing axis of the polarizing plate at the first substrate side and the orientation of the above-mentioned liquid crystal molecules is 130°–150°, and the angle $\theta_3$ formed by the polarizing axis or the absorbing axis of the polarizing plate at the second substrate side and the orientation of liquid crystal molecules at the second substrate side is 125°–145°. The invention is referred to as the ninth invention.

There is provided a color liquid crystal display apparatus according to any one of the first through fourth inventions, wherein the twist angle of the liquid crystal layer is 230°–250°, $\Delta n_1 \cdot d_1$ is 1.7 μm–1.85 μm and $\Delta n_2 \cdot d_2$ is 1.75 μm–1.95 μm; the angle $\theta_2$ formed by the slow axis and the orientation of liquid crystal molecules at the first substrate side is 850°–105°; the angle $\theta_1$ formed by the polarizing axis or the absorbing axis of the polarizing plate at the first substrate side and the orientation of the above-mentioned liquid crystal molecules is 140°–160°; and the angle $\theta_3$ formed by the polarizing axis or the absorbing axis of the polarizing plate at the second substrate side and the orientation of liquid crystal molecules at the second substrate side is 125°–145°. The invention is referred as the tenth invention.

There is provided a color liquid crystal display apparatus according to any one of the first through tenth inventions, wherein the refractive index of the birefringent plate satisfies the following formula 1:

$$0.7 \geq n_Z = (n_X - n_Z)/(n_X - n_Y) \geq 2.$$

The invention is referred as the eleventh invention.

There is provided a color liquid crystal display apparatus according to any one of the first through eleventh inventions, wherein the driving circuit is capable of multiplexing driving at a high duty ratio of 1/64 or more. The invention is referred as the twelfth invention.

There is provided a color liquid crystal display apparatus according to any one of the first through eleventh inventions, wherein the driving circuit is capable of multiplexing driving at a high duty ratio of 1/100 or more. The invention is referred as the thirteenth invention.

There is provided a color liquid crystal display apparatus according to any one of the first through eleventh inventions, wherein the driving circuit is capable of multiplex driving at a high duty ratio of 1/200 or more. The invention is referred to as the fourteenth invention.

There is provided a color liquid crystal display apparatus according to any one of the first through fourteenth inventions, wherein in determination of a predetermined level of effective voltage, the application of an OFF waveform, or the application of an ON waveform, or the application of frames of ON waveform and frames of OFF waveform in a mixed state is selected in multiplexing driving, whereby at least 4 kinds of effective voltage can be applied. The invention is referred to as the fifteenth invention.

There is provided a color liquid crystal display apparatus according to any one of the first through fifteenth inventions, wherein $\Delta n$ of the liquid crystal used is 0.20 or more and the viscosity $\eta$ is 17 cSt or less. The invention is referred to as the sixteenth invention.

There is provided a color liquid crystal display apparatus according to any one of the first through sixteenth inventions, wherein a reflecting plate is disposed at the outside of either one of the pair of polarizing plates. The invention is referred to as the seventeenth invention.

There is provided display apparatus wherein the color liquid crystal display apparatus defined in any one of the first through seventeenth inventions is used whereby a red color is developed by applying a certain voltage, and the red color is used for a display for drawing attention. The invention is referred to as the eighteenth invention.

There is provided a display apparatus wherein the liquid crystal display apparatus defined in the seventeenth invention is used for a potable electronic apparatus. The invention is referred to as the nineteenth invention.

There is provided a display apparatus wherein the color liquid crystal display apparatus defined in any one of the twelfth through fourteenth inventions is used so as to provide a dot matrix display suitable for displaying a graph. The invention is referred to as the twentieth invention.

BRIEF DESCRIPTION OF DRAWINGS

FIG. 28 is a diagram of the relation between $\Delta n \cdot d$ (liquid crystal) and $\Delta n \cdot d$ (birefringent plate).

DESCRIPTION OF THE PREFERRED EMBODIMENTS

Figure 1:
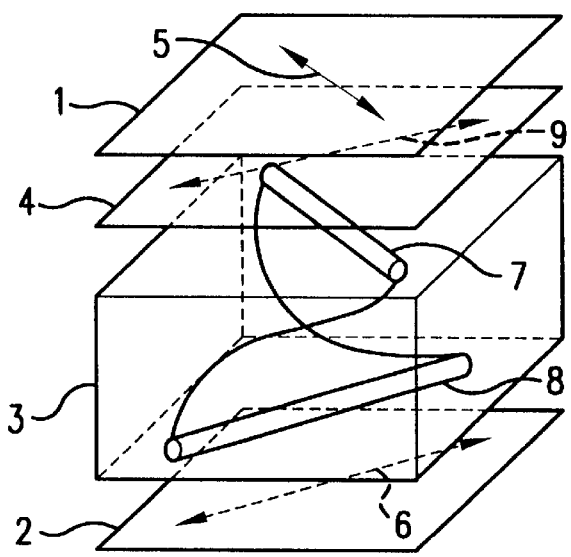
FIG. 1 is a perspective view showing in a form of model an embodiment of the liquid crystal display apparatus according to the present invention.

The present invention will be described in more detail.

In the present invention, the twist angle of liquid crystal molecules between the electrodes is determined in a range of 160°–300°. When the twist angle is less than 160°, the degree of change of the liquid crystal caused when the liquid crystal display element is subjected to multiplexing driving at a high duty ratio which requires a steep change of transmittance, is small. On the other hand when the twist angle is more than 300°, there easily causes hysteresis or domain by which light is scattered.

Further, the product $\Delta n_1 \cdot d_1$ of the refractive index anisotropy ($\Delta n_1$) of liquid crystal in the liquid crystal layer and the thickness ($d_1$) of the liquid crystal layer is determined to be 1.2 µm–2.5 µm. When the product is less than 1.2 µm, the degree of change of the state of liquid crystal to which a voltage is applied is small. On the other hand, when the product is more than 2.5 µm, it is difficult to display an achromatic color, or the viewing angle and the response characteristics become inferior. In particular, in order to develop an achromatic color and to increase a color change with respect to an applied voltage, it is desirable that $\Delta n_1 \cdot d_1$ of the liquid crystal layer is 1.3 µm–1.8 µm.

The value $\Delta n_1 \cdot d_1$ should be in a range to be satisfied in a temperature range for using the liquid crystal display element, and it is possible to display a beautiful picture in the temperature range of use. However, when the performance of the liquid crystal display element is required for outdoor use, there is a case that the above-mentioned values are satisfied only in a part of the temperature range of use. In this case, if a value of $\Delta n_1 \cdot d_1$ is out of the above-mentioned numerical range even in the temperature range of use, a desired color can not be obtained or there is found reduction in the viewing angle characteristics.

The structure of the color liquid crystal display apparatus of the present invention will be described.

Transparent electrodes such as ITO($In_2O_3$—$SnO_2$), $SnO_2$ or the like are formed on the front surfaces of substrates such as plastic, glass or the like, and the transparent electrodes are patterned to have a predetermined pattern each. A film of polyimide, polyamide or the like is formed on the surface of each of the substrates. The front surface of the film is subjected to rubbing or oblique vapor deposition of SiO or the like to thereby form an aligning layer. Between the substrates with transparent electrodes, a liquid crystal layer including nematic liquid crystal of a positive dielectric anisotropy wherein the liquid crystal has a twisted angle of 160°–300° is interposed.

As a typical example of such a structure, there is a dot matrix liquid crystal display element having a large number of electrodes in a matrix form wherein 640 electrodes are formed in a form of a stripe on either of the substrates and 400 electrodes are formed in a form of a stripe on the other substrate so as to be perpendicular to the former electrodes, whereby a display of 640×400 dots is formed. Generally, the size of a pixel for forming a dot is about 270 µm×270 µm, and spaces between pixels are about 30 µm.

An insulating film such as $TiO_2$, $SiO_2$, $Al_2O_3$ or the like may be formed in order to prevent short circuit between the electrodes and the aligning layer in each of the substrates, or a lead electrode of low resistance such as Al, Cr, Ti or the like, may be additionally attached to the transparent electrode.

A pair of polarizing plates are disposed at outer sides of the liquid crystal layer. It is usual that the polarizing plates themselves are disposed at the outsides of the substrates which form a cell. Depending on the performance of the liquid crystal display element, any of the substrates themselves may be formed in combination of a polarizing plate and a birefringent plate, or a birefringent layer and a polarizing layer may be disposed between the substrate and the electrode. The birefringent plate should be disposed between the liquid crystal layer and the polarizing plate. For instance, it should be disposed in a form of a layer between the liquid crystal layer and the electrode; or it should be disposed in a form of a layer between the electrode and the substrate; or the substrate itself may be replaced by the birefringent plate; or the birefringent plate may be disposed in a form of a layer between the substrate and the polarizing plate, or any combination of these may be used.

Selection of colors is carried out by selecting gradation voltage levels. As methods of determining voltage levels, there have been known various methods such as a frame gradation method, an amplitude gradation method, a pulse width gradation method and so on.

Any method may be used as far as the magnitude of effective voltages to be applied to the liquid crystal can be changed. The frame gradation method is generally employed to obtain an excellent display. Further, a false gradation may be used.

A driving method in which a plurality of row electrodes are simultaneously selected (i.e. a multi-line selection method) may be used. In using such a method, the response speed of the liquid crystal is low since it is necessary to determine $\Delta n \cdot d$ to be 1.2 or more. In order to avoid such a disadvantage, it is desirable to determine the physical values of the liquid crystal or a liquid crystal composition to be $\Delta n \geq 0.20$ and $\eta \leq 17$ cSt. When the multi-line selection method is used, a bright color display of high response speed can be obtained while a flicker is minimized and the contrast ratio is not reduced.

In order to use the multiplexing driving, it is necessary to increase an optical change to a voltage applied. In the present invention, the following points have to be considered to obtain an increased optical change.

First, the twist angle of the liquid crystal has to be increased as pointed out by Sheffer et al. When the twist angle is increased, a change of liquid crystal molecules to an applied voltage can be made large, and an optical change to the voltage can be made large.

Secondary, $\Delta n \cdot d$ of the liquid crystal layer itself has to be increased. An increased value of $\Delta n \cdot d$ of the liquid crystal layer can enhance the optical change even though the change of liquid crystal molecules in the liquid crystal layer to the applied voltage is the same.

Figure 6:
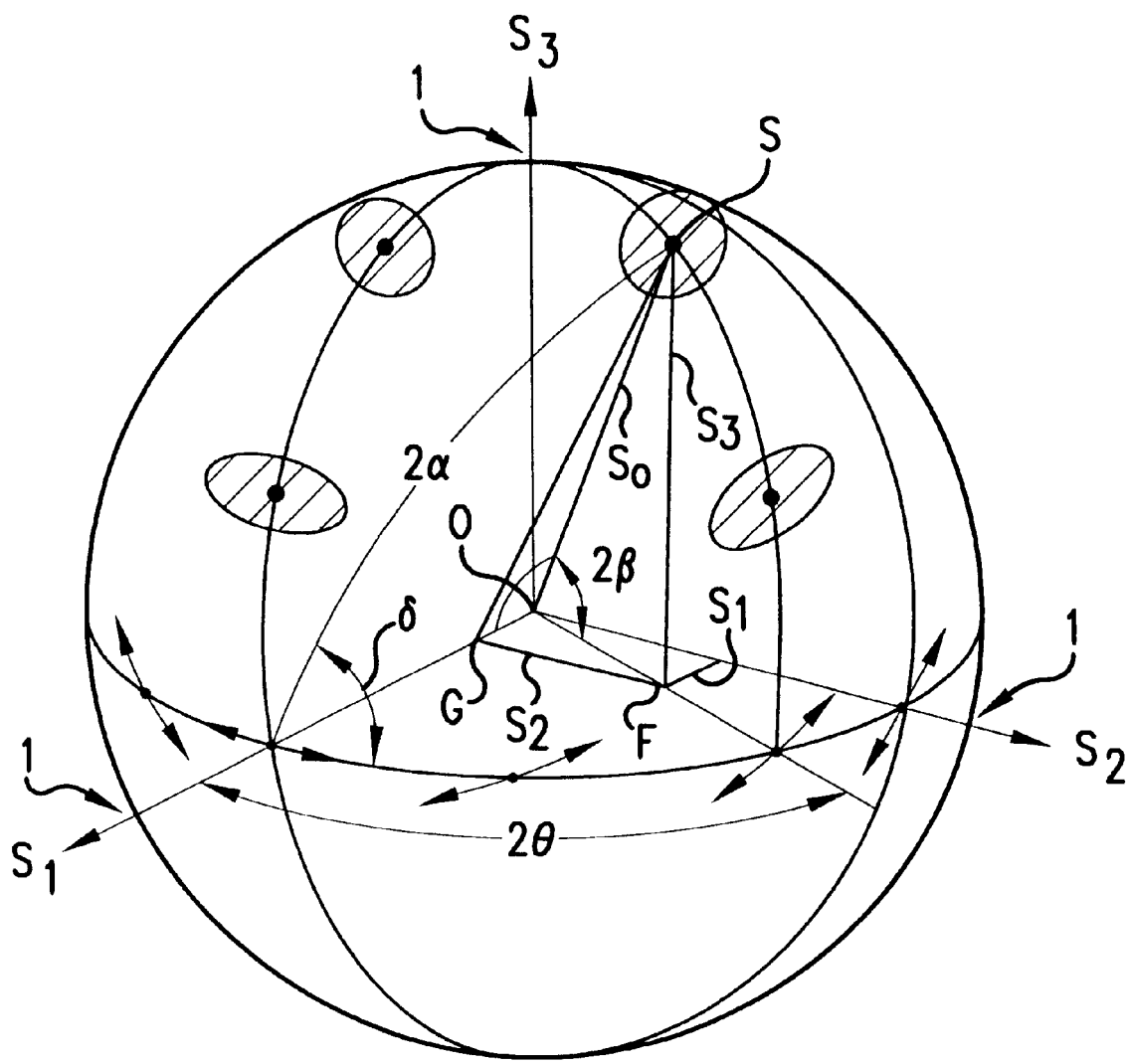
FIG. 6 is a diagram of Poincarè sphere showing a state of polarized light.

Generally, the Poincarè sphere is used to show a state of polarized light. As shown in FIG. 6, the equator represents linearly polarized light, the latitude represents an ellipticity, and the north pole or the south pole represents circularly polarized light. The longitude represents the direction of elliptic axis of the elliptically polarized light.

The locus goes here and there or round and round on the surface of Poincarè sphere. The black dots means to locate in visible and white dots for backside (FIG. 18–27).

For making a reflection type color liquid crystal device having white color development, the polarizing plates are arranged at the equator position.

In FIG. 6 there are relations such as 1) $S_0^2 = S_1^2 + S_2^2 + S_3^2$; 2) $S_1 = S_0 \cos(2\beta) \cdot \cos(2\theta)$, $S_2 = S_0 \cos(2\beta) \cdot \sin(2\theta)$ and $S_3 = S_0 \sin(2\beta)$; and 3) $\theta$=the direction of long axis, $\beta$=the angle of elliptic, and $S_0$=intensity.

Figure 7A:
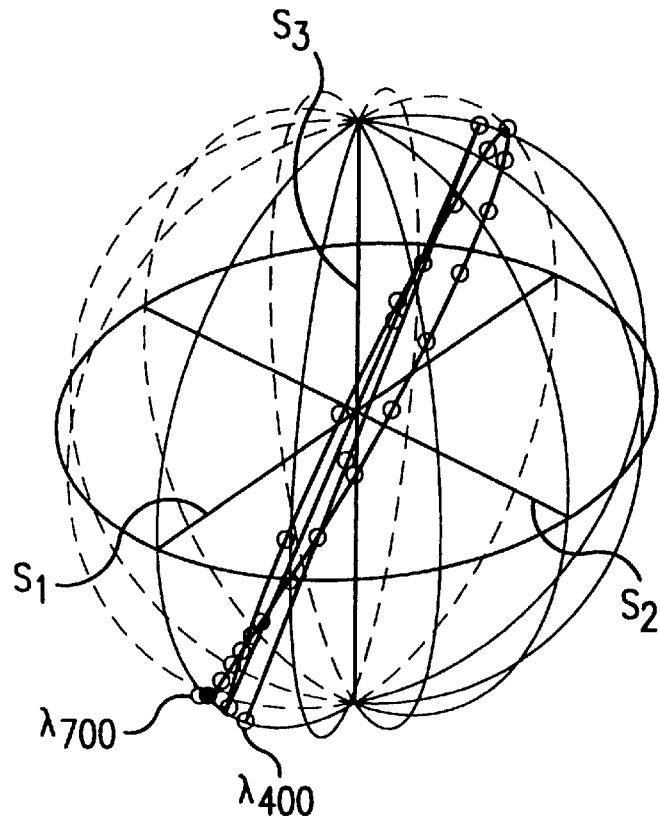
FIG. 7a is a diagram of Poincarè sphere showing a state of polarized light in a visible range of 400 nm–700 nm and FIG. 7b is a diagram of the projection of light on an $S_1$–$S_2$ plane.
Figure 7B:
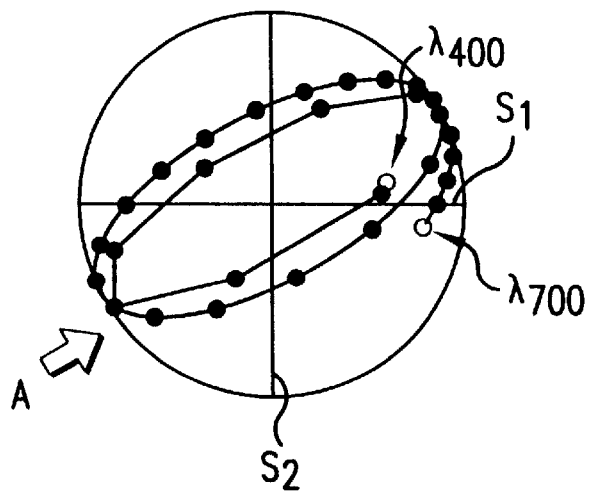

FIGS. 7a and 7b show the state of elliptically polarized light in a case that, for instance, linearly polarized light in a visible range of 400 nm–700 nm passes though the liquid crystal having a twist angle of 240° and $\Delta n \cdot d$ of 1.4 µm. FIG. 7a shows the state in a space defined by $S_1$–$S_2$–$S_3$ wherein each step corresponding to each mark represents a unit of 10 nm and shows a change from 400 nm to 700 nm. $\lambda_{400}$ and $\lambda_{700}$ indicate edge points respectively. FIG. 7b is a diagram obtained by projecting the elliptically polarized light on a S1–S2 plane. The above-mentioned description can be applied to each Poincarè sphere described hereinafter.

When a polarizing plate is disposed at the position indicated by an arrow mark A under the above-mentioned state, it is understood that the substantial amount of light of wavelength near 400 nm or 700 nm does not transmit the liquid crystal display element since light can transmit depending on the distance from the position where the polarizing plate is disposed.

Figure 8A:
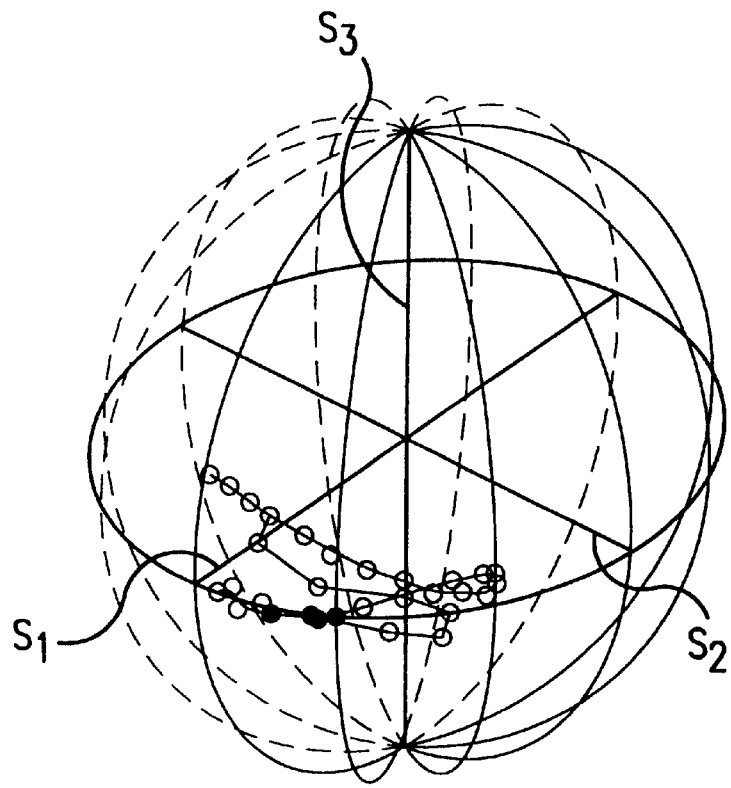
FIG. 8a is a diagram of Poincarè sphere showing a state of polarized light in a visible range of 400 nm–700 nm obtained when a birefringent plate is used together and FIG. 8b is a diagram of the projection of light on an $S_1$–$S_2$ plane.
Figure 8B:
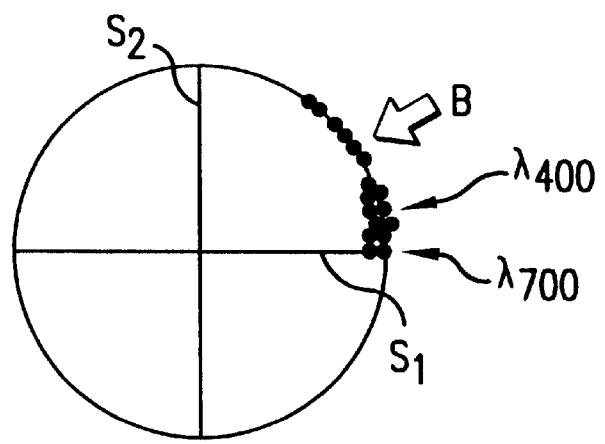

If a birefringent plate is used in combination with the polarizing plate, light having a wavelength of the visible region of 400 nm–700 nm can be substantially collected at a position in the Poincarè sphere. For instance, liquid crystal having $\Delta n_1 \cdot d_1$ of 1.4 $\mu$m and birefringent plate having $\Delta n_2 \cdot d_2$ of 1.3 $\mu$m are used, light having a wavelength of the visible region can be substantially collected at the position indicated by B as shown in FIGS. 8a and 8b. Namely, a display of substantially white can be obtained when the polarizing plate is disposed at the position indicated by the arrow mark B.

Figure 9:
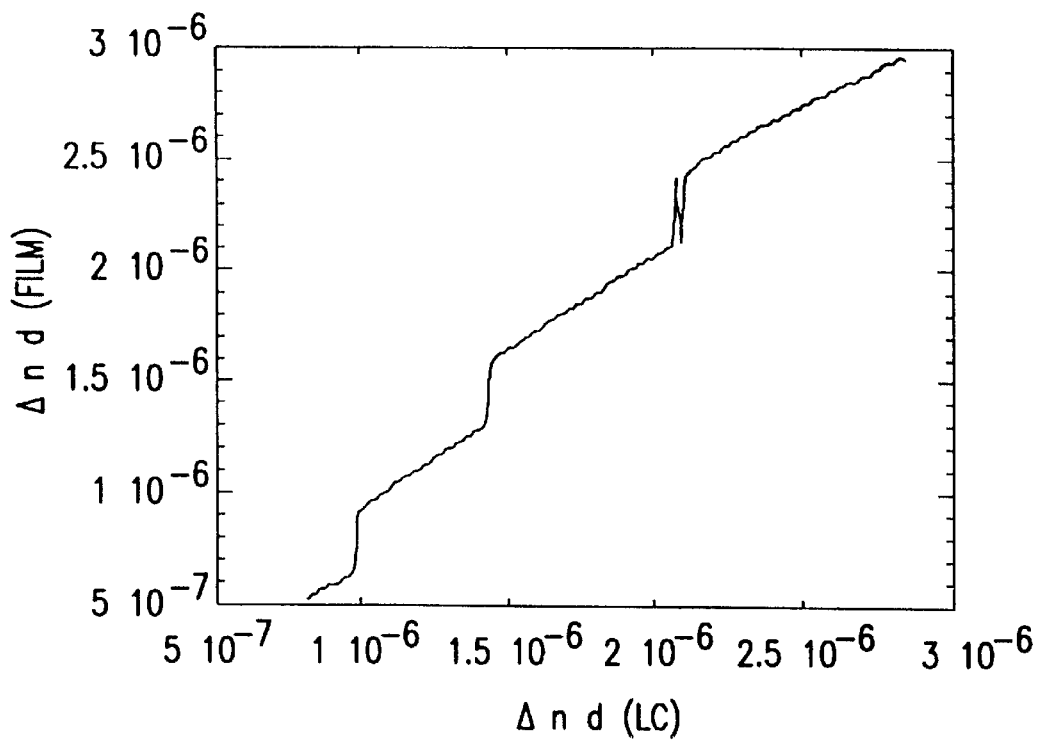
FIG. 9 is a graph showing the correlation of liquid crystal and $\Delta n \cdot d$ of the birefringent plate (of polycarbonate) by simulation.

There is the optimum value in displaying a white tone by suitably selecting the value of $\Delta n \cdot d$ of the liquid crystal and the value $\Delta n \cdot d$ of the birefringent plate. FIG. 9 shows the optimum value of $\Delta n \cdot d$ of the liquid crystal in the abscissa and the optimum value $\Delta n \cdot d$ of the birefringent plate in the ordinate. FIG. 9 shows the nearest condition of obtaining a C-light source for presenting a white tone, and it is possible to display a white display in the vicinity of the line in FIG. 9.

Figure 10:
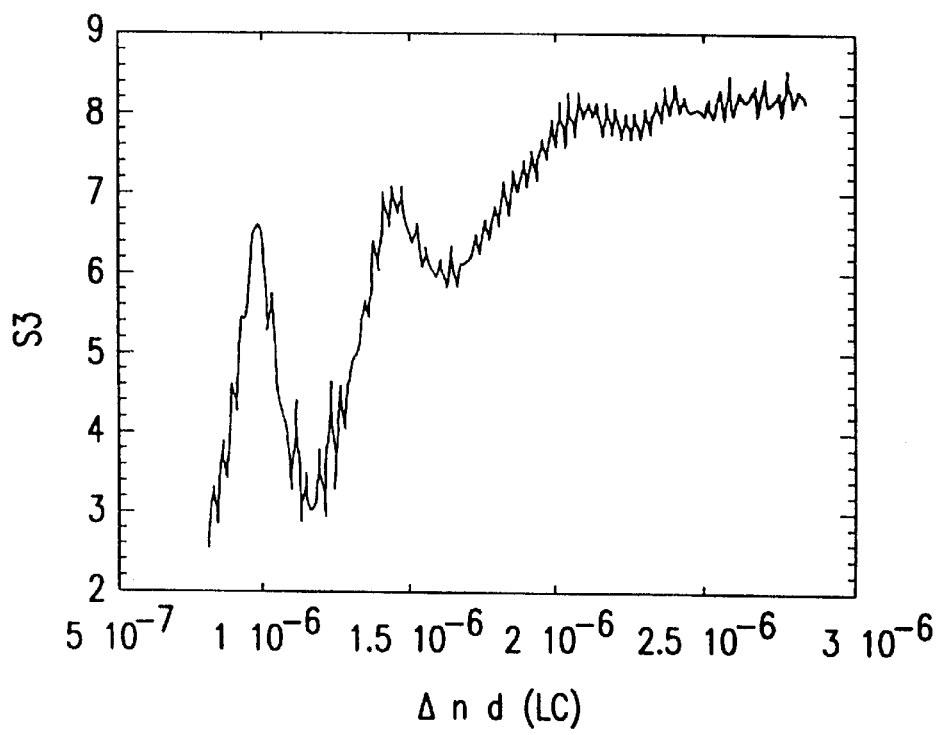
FIG. 10 is a graph showing the correlation of $\Delta n \cdot d$ of the birefringent plate (of polycarbonate) and $S_3$ by simulation.

FIG. 10 shows the degree of whiteness obtained from the condition as shown in FIG. 9. When $\Delta n \cdot d$ of the liquid crystal is in a range of 1.1 $\mu$m–1.4 $\mu$m or 1.6 $\mu$m–1.8 $\mu$m, a white tone near the color of light emitted from the C light source can be obtained. S3 in the ordinate represents the degree of whiteness of light to be displayed. The optimum condition varies depending on wavelength dispersion of the birefringent plate. Data in FIG. 9 were obtained by using polycarbonate having a cell gap of 8.1 $\mu$m as the birefringent plate. Data of FIGS. 11 and 12 were obtained by using polysulfone having a cell gap of 8.1 $\mu$m as the birefringent plate. It is understood that $\Delta n \cdot d$ of the liquid crystal which is the most suitable for developing a white tone is changed.

Since the optimum value of $\Delta n \cdot d$ is changed depending on the wavelength dispersion of the birefringent plate, a combination of material to be used and the liquid crystal layer should be carefully selected. When $\Delta n \cdot d$ of the liquid crystal is 2.5 $\mu$m or more, it is difficult to develop a white tone even when compensation is made with the birefringent plate. Accordingly, it is undesirable that $\Delta n \cdot d$ of the liquid crystal is 2.5 $\mu$m or more. In other words, a display of white can be obtained when the phases of lights each having a wavelength of visible range are substantially aligned.

Figure 11:
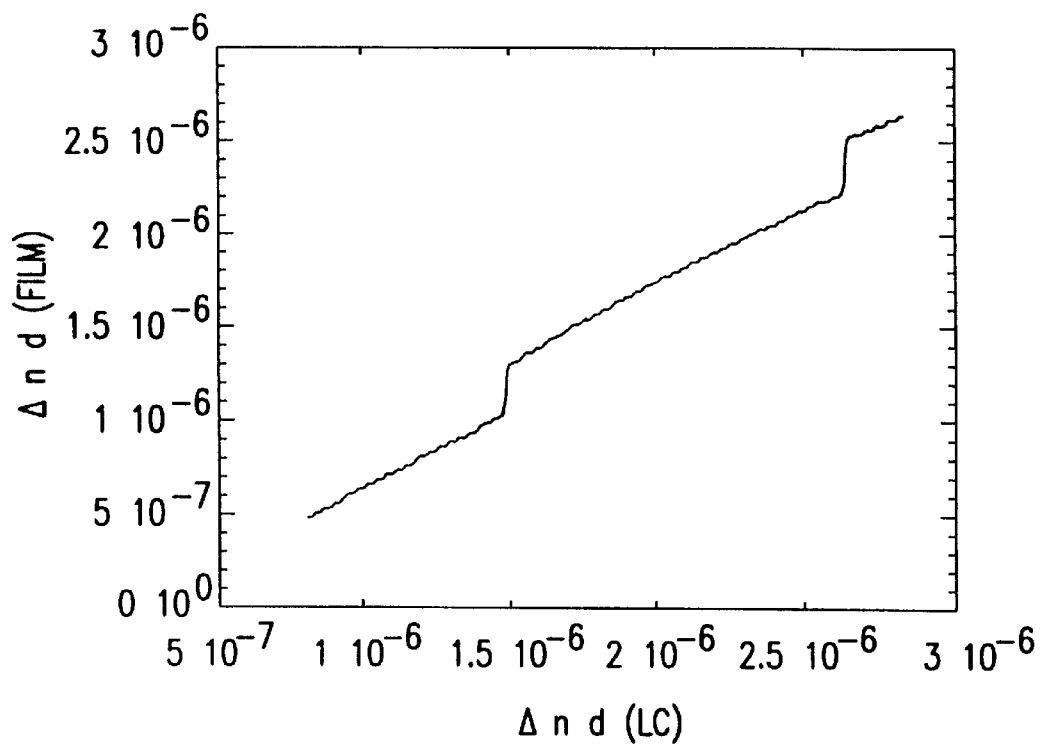
FIG. 11 is a graph showing the correlation of liquid crystal and $\Delta n \cdot d$ of a birefringent plate (of polysulfone) by simulation.
Figure 12:
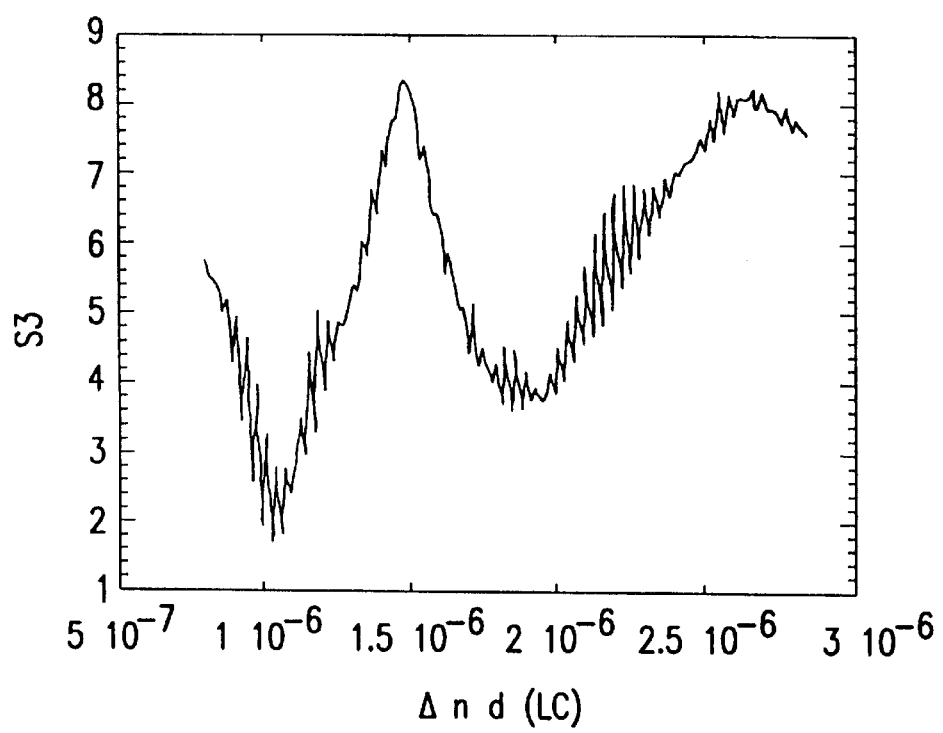
FIG. 12 is a graph showing the correlation of $\Delta n \cdot d$ of the birefringent plate (of polysulfone) and $S_3$ by simulation.

The characteristic curves in FIG. 9 and FIG. 11 locate substantially at the diagonal line of the graph wherein ordinate is the $\Delta n \cdot d$ of retardation film and abscissa is the $\Delta n \cdot d$ of liquid crystal. And the curves show the stair-like change with a cycle. This is called to be the center curve of $\Delta n_1 \cdot d_1 - \Delta n_2 \cdot d_2$ relationship.

Examples 1, 2, 3, 7, 4 and 8 are substantially on line or neighboring the curve.

Examples 5 and 6 are related to the 2nd and 3rd curves which are substantially parallel to the center curve of Examples 1, 2 and so on. But these curves (not shown in figure) have the tendency of less purity in color, especially white, in comparison to the center curve.

In FIG. 10, the ordinate shows the integrated $S_3$ value of 31 dots from $\lambda_{400}$ to $\lambda_{700}$ locus at a certain $\Delta n_1 \cdot d_1$ which is shown in Poincarè sphere.

The $S_3$ value at north or south pole is normalized to be 1 as shown in FIG. 6.

Computer simulation was performed to calculate the optimum combination of $\Delta n_1 \cdot d_1$ (LC) and $\Delta n_2 \cdot d_2$ (Film) with some parameters such as properties of LC for good characteristic of white development. So the diagonal line which looks like a stair having a slanted land was obtained.

The diagonal line means the top point of $\Delta n_2 \cdot d_2$ (Film) for a $\Delta n_1 \cdot d_1$ (LC). The integrated $S_3$ value for each point of the diagonal line in FIG. 9 is shown in FIG. 10. The valley area of $S_3 - \Delta n \cdot d$ (LC) curve is further preferred since a better white is obtainable in the axis of $\Delta n_1 \cdot d_1$ (LC) parameter.

Figure 13:
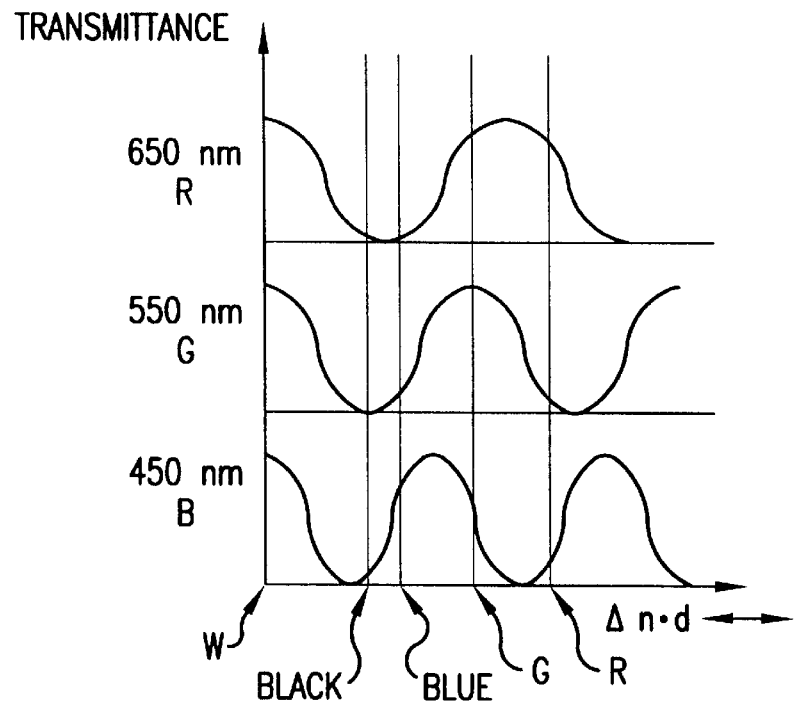
FIG. 13 is a graph showing a relation of $\Delta n \cdot d$ and transmittance in a case that colors of white (W), black, blue, green (G) and red (R) are successively developed.
Figure 14:
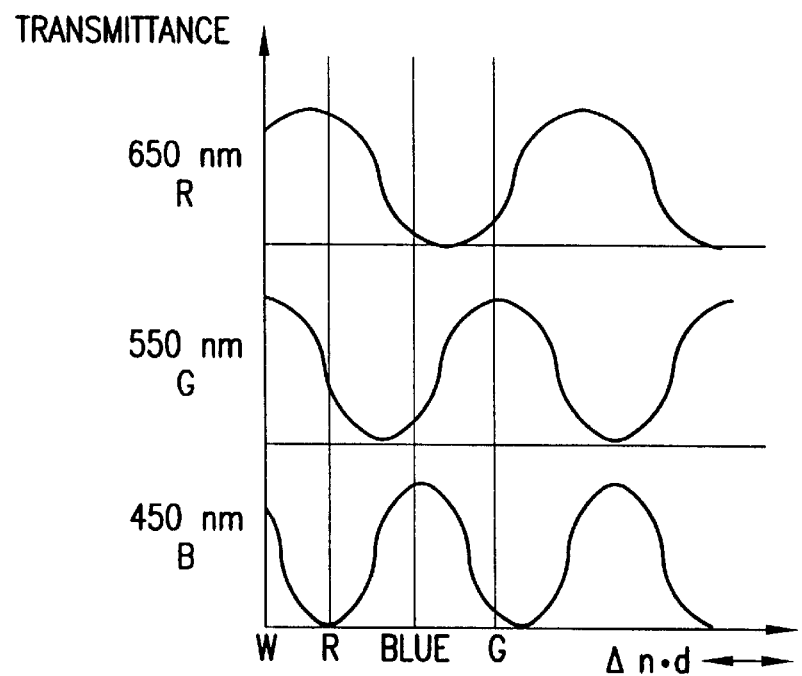
FIG. 14 is a graph showing a relation of $\Delta n \cdot d$ and transmittance in a case that colors of white (W), red (R), blue and green (G) are successively developed.

FIG. 13 shows the transmittance of a blue color light of 450 nm, a green color light of 550 nm and a red color light of 650 nm wherein the abscissa represents the change of $\Delta n \cdot d$ and the ordinate represents the transmittance. With a change of $\Delta n \cdot d$, the transmittance is generally in proportion to $\cos^2(2\pi \cdot \Delta n \cdot d/\lambda)$.

It is understood that the cycle of a change of the transmittance of each of the lights having different from wavelengths is different from each other in response to a change of $\Delta n \cdot d$. In FIG. 13, a series of color change of white, black, blue, green and red can be obtained. In the conventional monochrome type liquid crystal display apparatus, $\Delta n \cdot d$ of liquid crystal is determined so as to obtain a change from white to black. However, according to the present invention, $\Delta n \cdot d$ of the liquid crystal is changed so as to obtain a change from white to red. For this change, it is necessary to increase the optical change of the liquid crystal to an applied voltage as described before. Example 2, which will be described hereinafter, utilizes such change.

Figure 4:
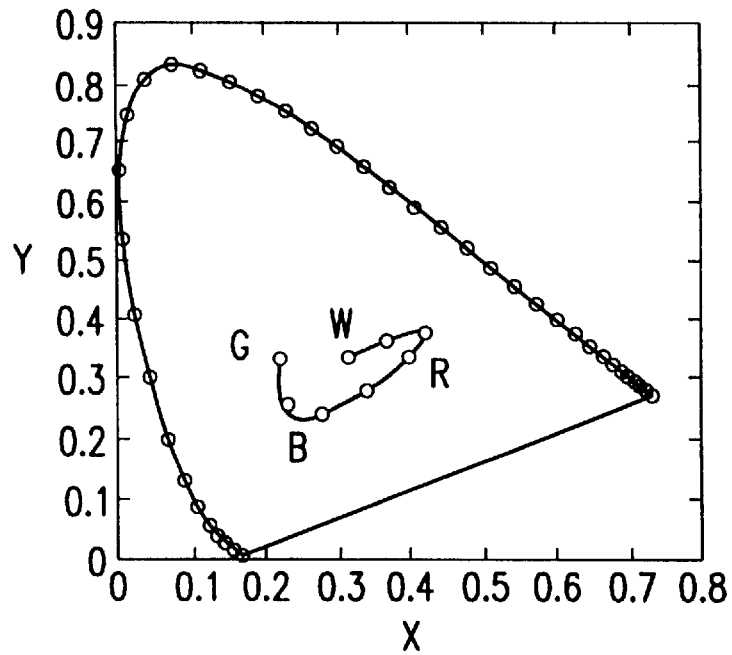
FIG. 4 is a chromaticity diagram of color change vs voltage in Example 1.

As shown in FIG. 4 showing development of color light, light can be successively changed in the order of white, red, blue and green. When the polarizing plates are combined with the liquid crystal layer with a shifted angle of 90°, black is obtainable for white, or complementary colors of specified colors are obtainable, and there is a color change such as a series of black, cyan, yellow and reddish purple. Thus, each of the colors can be obtained in the sequence as described above. However, it is possible that transient colors are not recognized by driving the liquid crystal display element at a high speed.

When the liquid crystal display element is driven at a duty ratio of 1/100 by multiplexing driving, it is necessary to cause a fairy large optical change of the liquid crystal to a voltage to be applied. As a method to realize such a large optical change, there is a method of changing the twist angle of the liquid crystal. However, when the twist angle is excessively made large, there causes a domain undesirably. Further, determination of a large value of $\Delta n \cdot d$ is undesirable for developing a white tone. In addition, the response speed and the viewing angle characteristics will be deteriorated.

Supposing that $\Delta n \cdot d$ of the liquid crystal is not completely adjusted with the birefringent plate and the elements of the liquid crystal display element are so arranged to realize a substantially white tone under the conditions that the phase of red is delayed and the phase of blue is advanced, a display of red is first obtainable with a change of $\Delta n \cdot d$ of the liquid crystal, and then, the display is a changed in the ordering of blue and green. Use of such a technique allows obtaining a white display at the time of an OFF waveform in the multiplexing driving without causing a large optical change of the liquid crystal to a voltage to be applied, and allows to drive the liquid crystal display element at a duty ratio of 1/100 or more, whereby a display of red, blue or green is possible.

In the multiplexing driving, the smallest effective voltage to be applied to pixels is $V_{OFF}$. It is preferable that design be made to achieve a white display when the $V_{OFF}$ voltage is applied. For this purpose, design should be made so as to compensate a state that liquid crystal molecules are slightly raised, by using the birefringent plate, whereby a bright white display can be obtained in the multiplexing driving.

Generally, there are two kinds of methods to represent $\Delta n_2 \cdot d_2$ of the birefringent plate, i.e. one is a spectroscopic method and the other is a measuring method with use of a wavelength near 590 nm. In the spectroscopic method, 500 nm, for instance, indicates $\Delta n \cdot d$ of 500 nm which is obtained through measurement with use of light having a wavelength of 500 nm. In the description of the present invention, however, $\Delta n \cdot d$ means the value obtained by measurement with use of a wavelength near 590 nm. Further, although the value $\Delta n \cdot d$ is generally changed depending on temperature, the value $\Delta n \cdot d$ is meant to be such one measured at the room temperature.

The range of $\Delta n \cdot d$ is preferably determined to be usable in a temperature range of use for the liquid crystal display apparatus so that a beautiful display can be achieved in such temperature range. However, where there is a requirement for outdoor use, the display apparatus may be so constructed as to satisfy the above-mentioned relation only in a part of the temperature range of use. In this case, however, a predetermined display color may not be obtained and the viewing angle characteristics may be deteriorated when the value $\Delta n \cdot d$ is out of the above-mentioned temperature range.

In the next, the refractive index of the birefringent plate will be described.

In the present invention, the birefringent plate used satisfies a relation of $n_X \geq n_Z \geq n_Y$ wherein $n_X$, $n_Y$ and $n_Z$ represent three main refractive indices, and $n_X$ and $n_Y$ represent refractive indices in the direction of film plane of the birefringent plate where $n_X > n_Y$ and $n_Z$ represents the refractive index in the direction of the thickness of the birefringent plate. The birefringent plate used may be a transparent plate which exhibits birefringent properties, specifically, a biaxially oriented film or a biaxially crystallized plate made of an inorganic material such as mica, niter or the like. Any biaxial birefringent plate has a relation of $n_X > n_Z > n_Y$.

In the conventional technique, the optimization of the liquid crystal display element was conducted with respect to light entering into the liquid crystal display element from a perpendicular direction. Namely, it is enough to consider use of an uniaxial birefringent plate. However, when the uniaxial birefringent plate is used for compensation, it goes well with respect to light entering from the perpendicular direction, however, there arises a shift in compensation with respect to light entering from an oblique direction.

In the present invention, determination is made to be $n_X \geq n_Z \geq n_Y$ to thereby prevent a color change of light watched from an oblique direction, and to improve the appearance. When $n_Z$ is greater than $n_X$ or smaller than $n_Y$, the angular dependence is decreased and the appearance of display watched from an oblique direction is decreased. In particular, further excellent effect is obtainable by satisfying the relation described with respect to the above-mentioned formula (2). The birefringent plate having such relation is generally called an $N_Z$ plate.

With use of the birefringent plate as described above in comparison with a case of using the uniaxial birefringent plate, a color liquid crystal display apparatus having a wide viewing angle can be obtained wherein deterioration of the quality of a display watched from an oblique direction is small. In order to obtain a predetermined birefringent effect, $\Delta n$ and d are adjusted. However, when it is difficult to adjust $\Delta n$ and d by using a single birefringent plate, a plurality of birefringent plates having the same or different property may be combined. In particular, it is necessary to adjust $n_Z$ to improve the angular dependence.

In the present invention, it is preferable to satisfy the relation described in formula 2. When the value is less than 0.2 or more than 0.7, the viewing angle becomes narrow.

$N_Z=1$ (uniaxial) type birefringent plate is employed in view of cost performance and in the condition of admissible tolerance of about viewing angle.

In the foregoing, description has been made so that the refractive index $n_Z$ in the direction of thickness of the birefringent plate is uniform in the direction of thickness. However, it is not always necessary to be uniform, it is enough that the refractive index in the thickness direction in average satisfies the before-mentioned condition. The same effect is obtainable even when $N_Z$ is nonuniform in the thickness direction.

Selection of colors is carried out by selecting gradation voltage levels. As methods of determining voltage levels for gradation, various methods such as a frame gradation method, an amplitude gradation method, a pulse width gradation method and so on have been proposed. Any method may be utilized as long as the magnitude of an effective voltage applied to the liquid crystal is changed. The frame gradation method is generally used to obtain an excellent display. Further, a false gradation may be used. For instance, when a duty ratio of 1/200 is used wherein an ON/OFF ratio is 1.07, intermediate voltages assume values divided by 1/8 (the number of gradation for driving). When a duty ratio of 1/100 is used, 1.1055 ($\doteq 1.11$) is provided. Colors can be obtained in a loop which shows development of color in chromaticity coordinates depending on the number of gradation for driving.

Further detailed explanation will be made. In the multiplexing driving, a waveform for forming a display pixel (an ON pixel) is called an ON waveform, and a waveform for forming a non-display pixel (an OFF pixel) is called an OFF waveform. The shape of the ON waveform or the OFF waveform, and a ratio of effective voltage of the ON waveform or the OFF waveform are determined depending on a duty ratio or a bias voltage.

An effective voltage of ON waveform applied in a frame is referred to as $V_{ON}$, and an effective voltage of the OFF waveform in a frame is referred to as $V_{OFF}$. An optimum bias method is supposed to be used, for instance. Then, $V_{ON}/V_{OFF}=1.07$ in a duty ratio of 1/200; $V_{ON}/V_{OFF}=1.09$ in a duty ratio of 1/128; $V_{ON}/V_{OFF}=1.13$ in a duty ratio of 1/64; $V_{ON}/V_{OFF}=1.20$ in a duty ratio of 1/32 and $V_{ON}/V_{OFF}=1.29$ in a duty ratio of 1/16.

Usually, only the effective voltage of $V_{ON}$ is applied to display pixels and the effective voltage of $V_{OFF}$ is applied to non-display pixels. Namely, an effective voltage between $V_{ON}$ and $V_{OFF}$ can not be applied. However, supposing that 7 frames are used; a frame of ON waveform is applied once and a frame of OFF waveform is applied 6 times, then, an average effective voltage of $(V_{ON}+V_{OFF}\times 6)/7$ is applied to pixels in a frame. It means that an effective voltage between $V_{ON}$ and $V_{OFF}$ can be applied to the pixels. Also, supposing that 7 frames are used wherein the frame of ON waveform is applied 3 times and the frame of OFF waveform is applied 4 times, an average effective voltage of $(V_{ON}\times 3+V_{OFF}\times 4)/7$ is applied to the pixels in a frame.

Further detailed explanation will be made with reference to diagrams showing driving waveform in FIG. 15 wherein the ordinate represents voltage value and the abscissa represents time. V3, V2 and V1 indicate voltage values with respect to the reference voltage of 0 V, and T1, T2 and T3 indicate time widths. In multiplexing driving with a duty of 1/200 and 1/15 bias, for instance, the ON waveform applied to a pixel is shown in FIG. 15A and OFF waveform applied to a non-display pixel is shown in FIG. 15B.

In the multiplexing driving with 1/200 duty and 1/15 bias, V3:V2:V1=15:13:1 and (T1+T2+T3):T2=200:1 where (T1+T2+T3) is referred to as one frame. T2 indicates a scanning time, and T1 or T3 indicates a non-scanning time. V1 indicates the height of a voltage applied to a display pixel in the scanning time; V2 indicates the height of a voltage applied to a non-display pixel in the scanning time, and V3 indicates the height of a voltage applied in the non-scanning time.

Figure 15A:
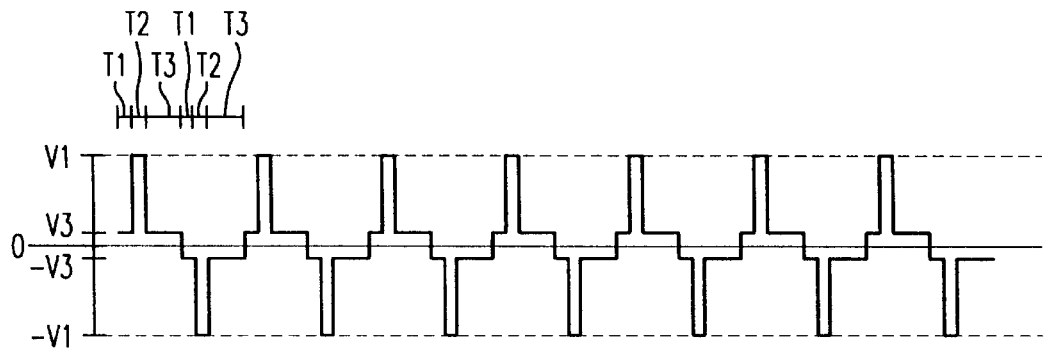
FIGS. 15a–15d are graphs showing waveforms in multiplexing driving.
Figure 15B:
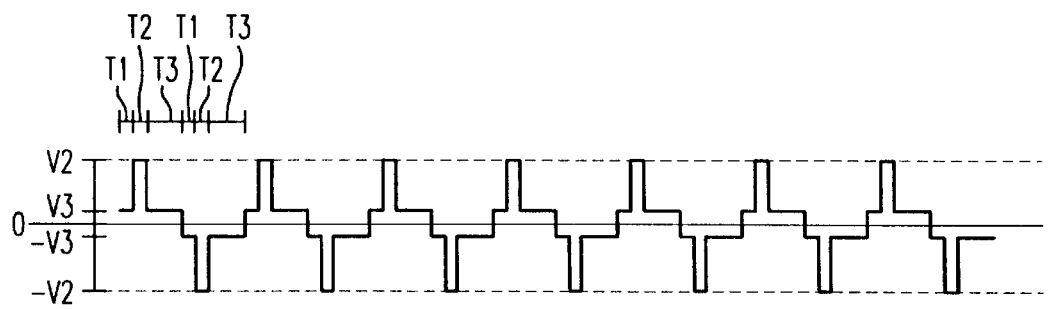

In FIG. 15A, it is assumed that an effective voltage applied in one frame is expressed by $V_{ON}$ and in FIG. 15B, an effective voltage applied in one frame is expressed by $V_{OFF}$. Generally, a voltage applied to liquid crystal is in a form of alternating current. This is because when a DC voltage is applied to the liquid crystal, decomposition of the liquid crystal occurs.

FIG. 15A shows a method of forming an alternating current voltage by applying an inversed frame just after the application of a normal frame. When an alternating current form is formed in each two frames as shown in FIG. 15A, a low frequency component is increased. Accordingly, a line inversion driving method is generally employed to eliminate such disadvantage.

Namely, the line inversion driving method is to change polarities every time of driving a predetermined number of lines in a frame. When it is considered to form an alternation waveform for each two frames, 14 frames are needed to obtain a display of 8 gradations.

FIG. 15A shows that in all 14 frames, voltage waveforms exhibit V1 or –V1 at the time of scanning. An averaged effective voltage applied in a frame corresponds to $V_{ON}$. In FIG. 15B, voltage waveforms at the time of scanning have V2 or –V2 in all 14 frames. An averaged effective value applied in a frame corresponds to $V_{OFF}$.

Figure 15C:
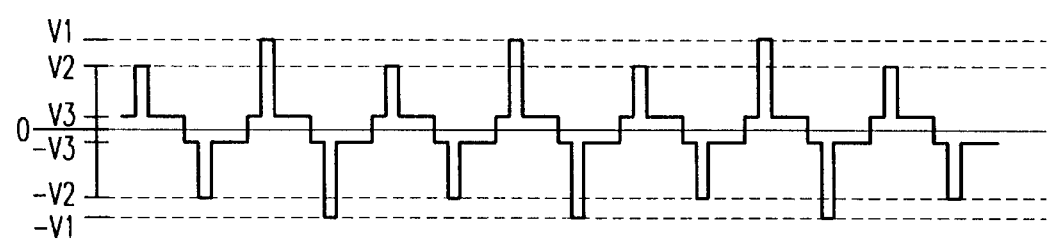

FIG. 15C shows 6 frames among 14 frames have the waveforms of V1 and 8 frames have the waveforms of V2.

Figure 15D:
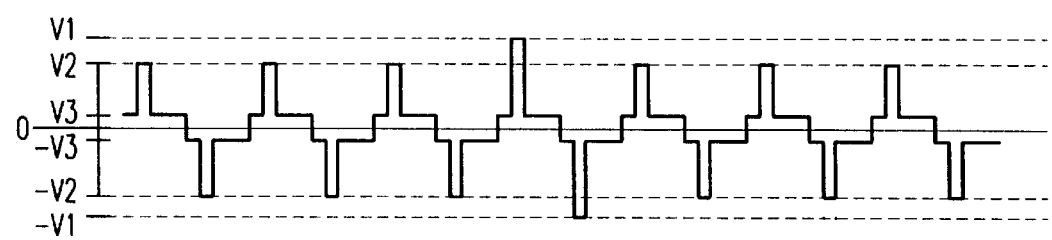

In this case, an averaged effective voltage of a frame applied has a value of $(V_{ON} \times 6 + V_{OFF} \times 8)/14$. FIG. 15D shows that two frames among 14 frames have the waveforms of V1, and 12 frames have the waveforms of V2. In this case, an averaged effective voltage of one frame applied has a value of $(V_{ON} \times 2 + V_{OFF} \times 12)/14$.

As described above, when the frames of ON waveform and the frames of OFF waveform are applied in a mixed state, effective voltages between the effective voltage provided by only the ON waveform and the effective voltages provided the OFF waveform can be selected.

In the following, description will be made as to differences between the conventional monochrome type STN liquid crystal display apparatus and the color liquid crystal display apparatus of the present invention.

In the conventional technique which provides a monochrome display with use of a STN liquid crystal display element, a birefringent plate is used for compensating a displayed color. For instance, in the liquid crystal display element, the twist angle of liquid crystal is 240° and Δn·d of the liquid crystal is 0.85 μm. Δn·d of the birefringent plate is 0.58 μm. Further, $\theta_1$=135°, $\theta_2$=90° and $\theta_3$=135°.

Figure 16:
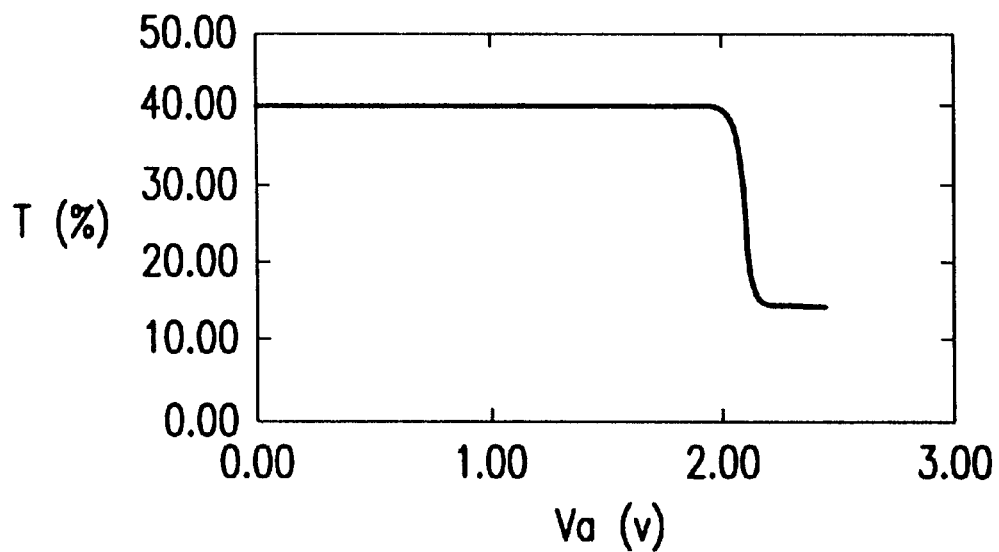
FIG. 16 is a graph of voltage vs transmittance in a conventional monochrome STN.
Figure 17:
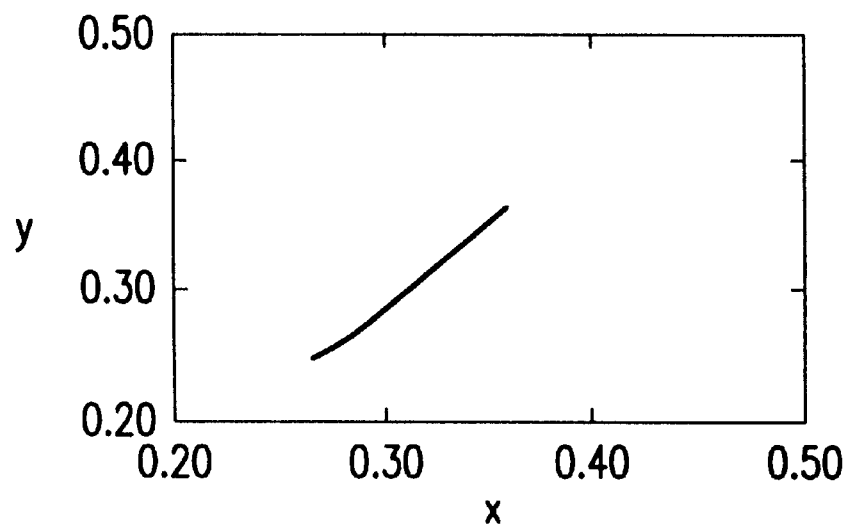
FIG. 17 is a chromaticity diagram showing a relation of voltage vs color change in the conventional monochrome STN.

FIG. 16 shows a change of applied voltage Va(V) v.s. transmittance T(%) and FIG. 17 shows a change in color development obtained by the above-mentioned conventional structure. The change of color starts from a position near a C-light source and gradually changes toward a dark blue color as an applied voltage is increased, without passing through the coordinate of red color or green color. Under such condition, even when multiplex driving of the effective voltage applied to the liquid crystal is conducted so that an intermediate voltage between $V_{ON}$ and $V_{OFF}$ is applied, only a display of monochrome gradation (gray) is exhibited and there is no color development.

Figure 18B:
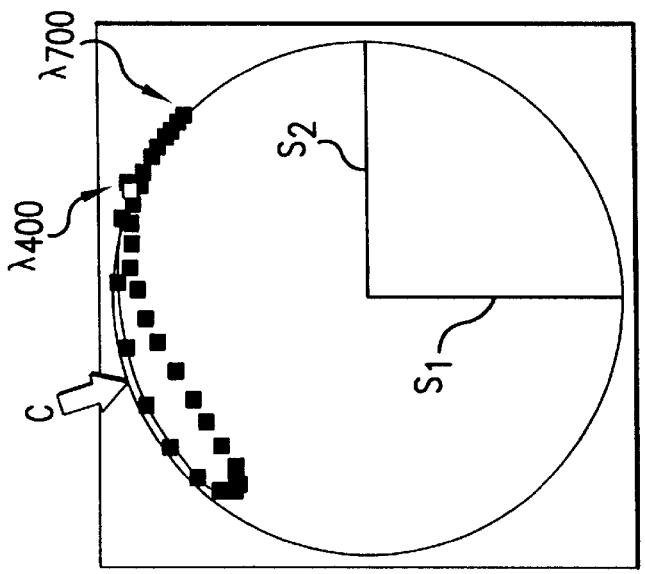
FIG. 18 is a diagram of Poincarè sphere in a state of $V_{OFF}$ in the conventional monochrome STN.
Figure 18A:
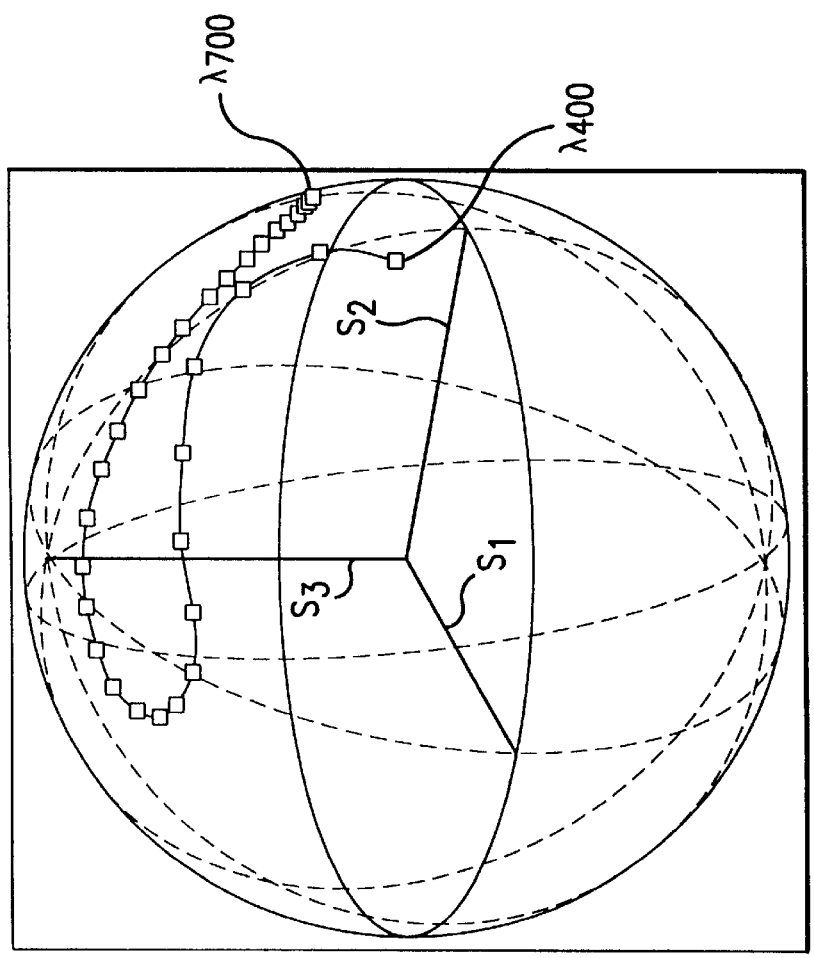
Figure 19B:
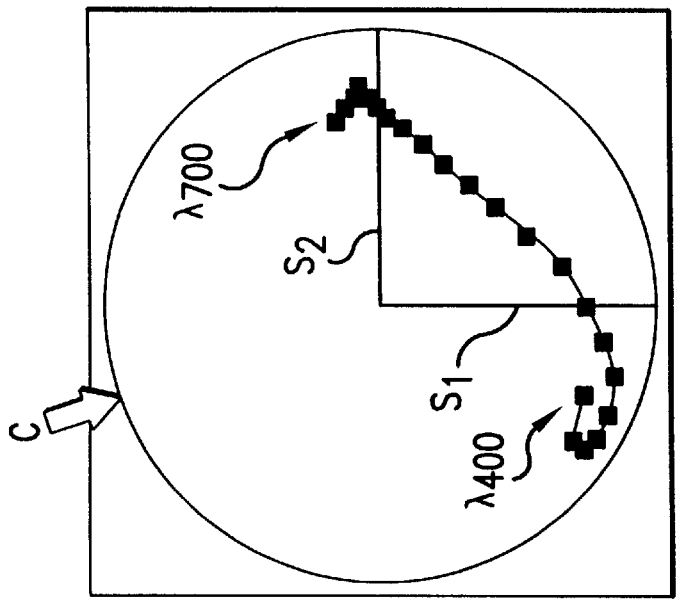
FIG. 19 is a diagram of Poincarè sphere in a state of $V_{ON}$ in the conventional monochrome STN.
Figure 19A:
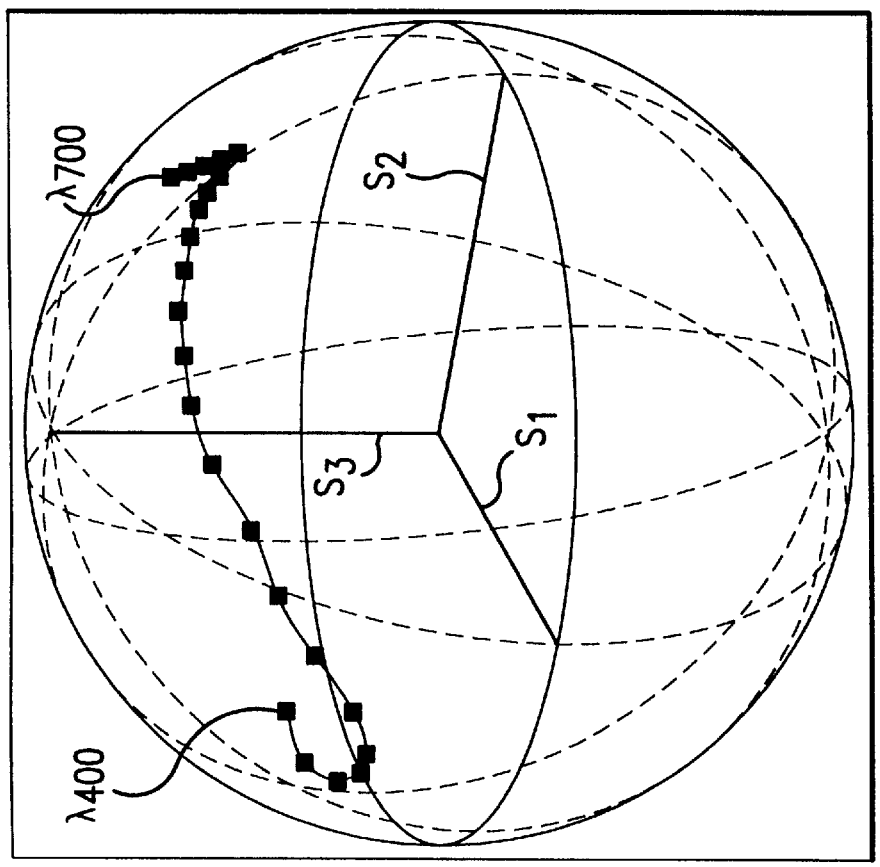

Such change of color is different from a color change resulted from Example 1 and 2 of the present invention wherein the application of intermediate voltages can provide a red display between white and dark blue. The reason is explained by using the Poincarè sphere. FIGS. 18 and 19 show a state of polarized light compensated by a birefringent plate wherein Δn·d of the liquid crystal is Δn·d=0.85 μm. FIG. 18 shows a state obtained by applying the waveform of $V_{OFF}$ in multiplexing driving, and FIG. 19 shows a state obtained by applying the waveform of $V_{ON}$.

In either of the states of $V_{OFF}$ and $V_{ON}$, it is understood that lights having the wavelength in a range of 400 nm–700 nm are substantially collected to a limited area, and the area is substantially opposite with respect to the center of the sphere. Namely, when the polarizing plate is positioned at a position indicated by an arrow mark C, a white display is possible in the state of $V_{OFF}$ and a dark display is possible in the state of $V_{ON}$. When intermediate voltages are applied, lights of wavelength in a range of about 400 nm–700 nm move as a lump whereby a gray display is provided. Namely, there is no color development by the application of intermediate voltages.

Figure 20B:
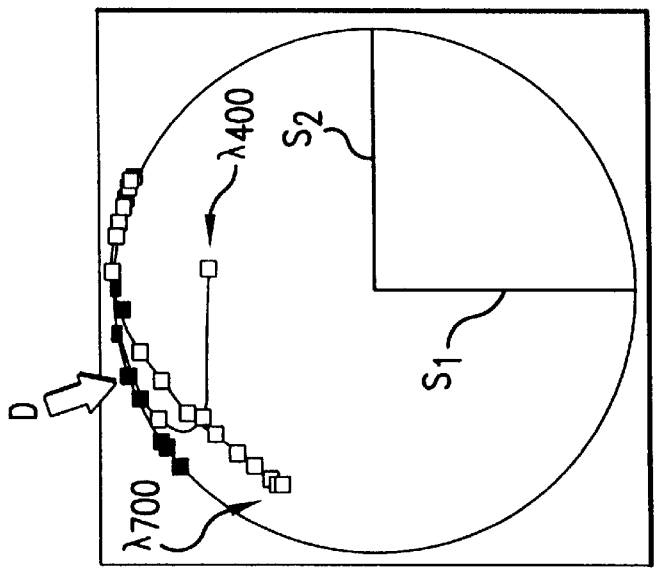
FIG. 20 is a diagram of Poincarè sphere in a state of white in Example 1.
Figure 20A:
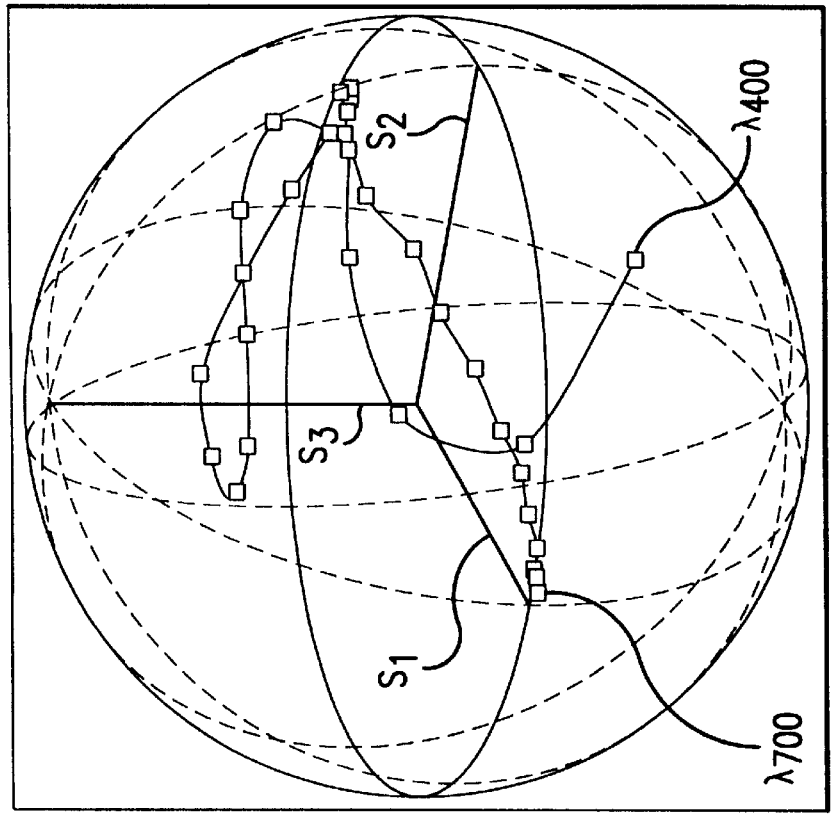
Figure 21B:
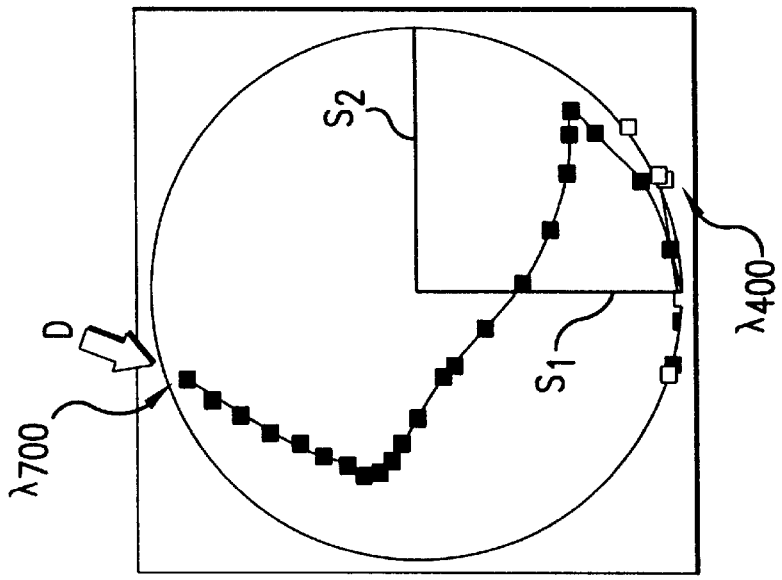
FIG. 21 is a diagram of Poincarè sphere in a state of red in Example 1.
Figure 21A:
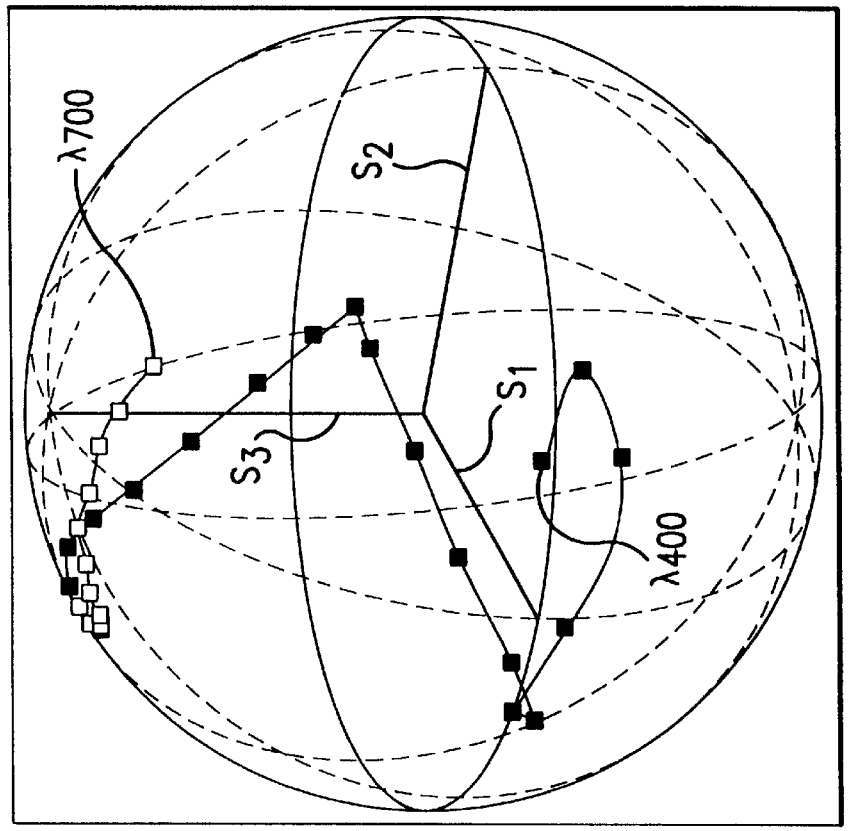
Figure 22B:
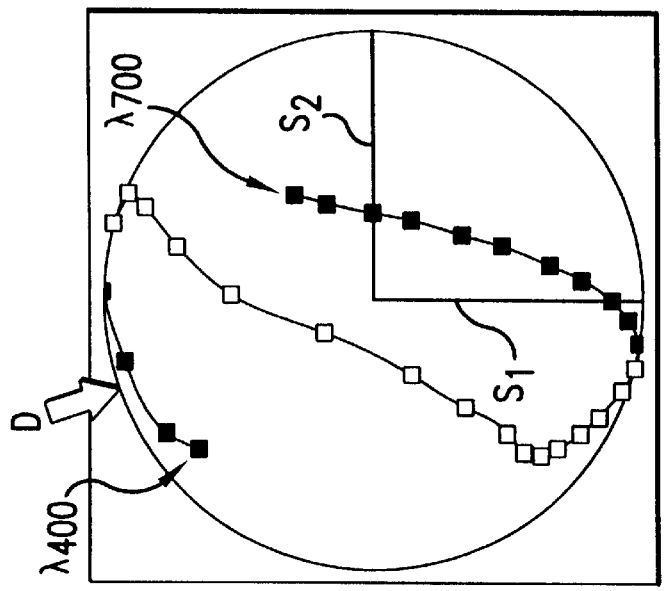
FIG. 22 is a diagram of Poincarè sphere in a state of blue in Example 1.
Figure 22A:
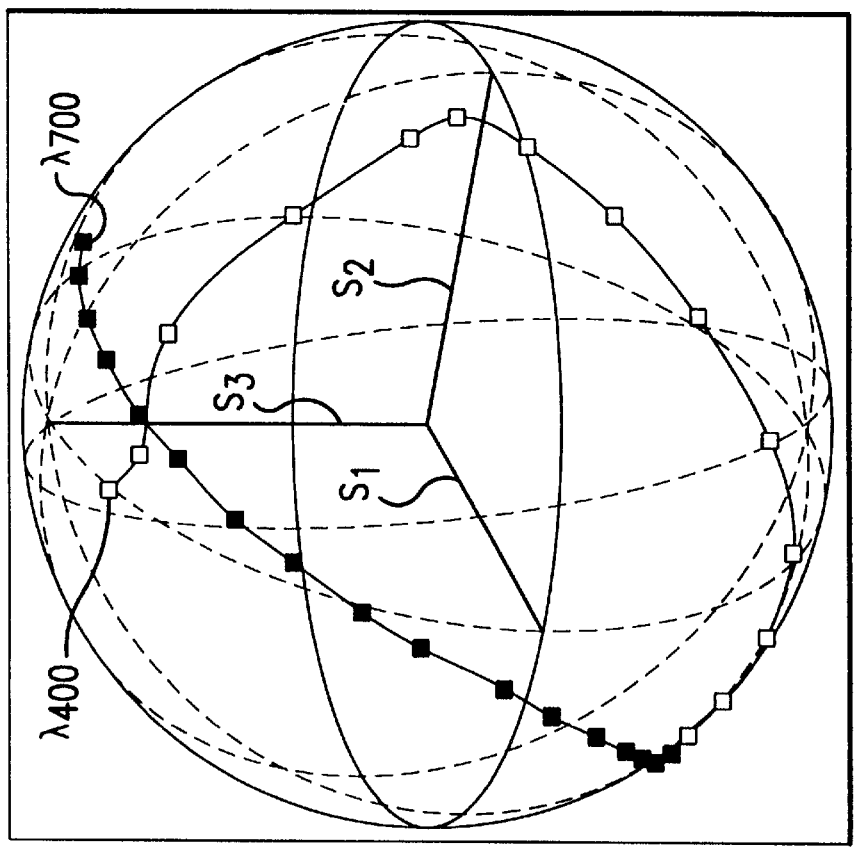
Figure 23B:
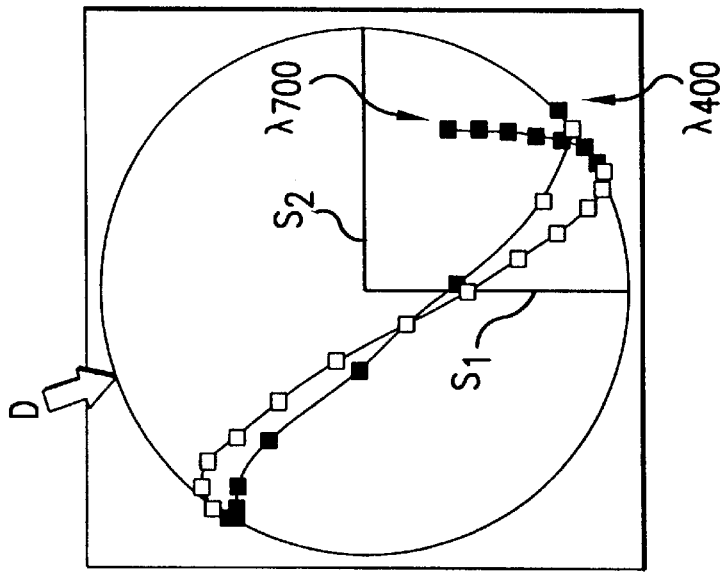
FIG. 23 is a diagram of Poincarè sphere in a state of green in Example 1.
Figure 23A:
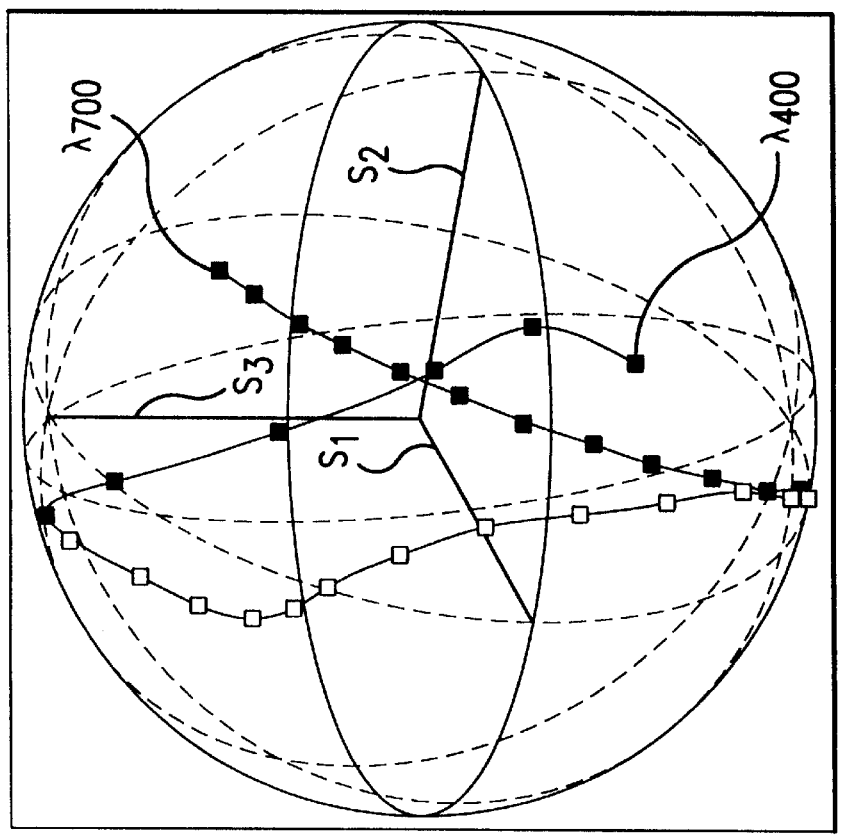

On the other hand, as described in Example 1 of the present invention, a state that the application of the waveform of $V_{ON}$ is applied is shown in FIG. 20. It is understood that lights of wavelength in a range of about 400 nm–700 nm are collected to a limited area. When intermediate voltages are applied, the state is shifted to states as shown in FIG. 21 and FIG. 22. When $V_{ON}$ is applied, the state is changed to the state as shown in FIG. 23. It is understood that in the states shown in FIGS. 21, 22 and 23, the lights of wavelength in a range of 400 nm–700 nm are distributed in a large area. In a change from the state shown in FIG. 20 to the state shown in FIG. 21, the light of short wavelength (near 400 nm) is shifted to the opposite side with respect to the center. However, the light of long wavelength (near 700 nm) still remains at the position of $V_{OFF}$. In FIGS. 22 and 23, a further spreaded state is found. When a polarizing plate is disposed at the position of arrow mark D, a white display is obtainable in the state of FIG. 20, a red display is obtainable in the state of FIG. 21, a blue display is obtainable in the state of FIG. 22 and a green display is obtainable in the state of FIG. 23.

It is understood that a bright white display is provided in $V_{OFF}$, and a display of red, blue or green is possible without forming a dark display even when an applied voltage is increased.

Figure 24B:
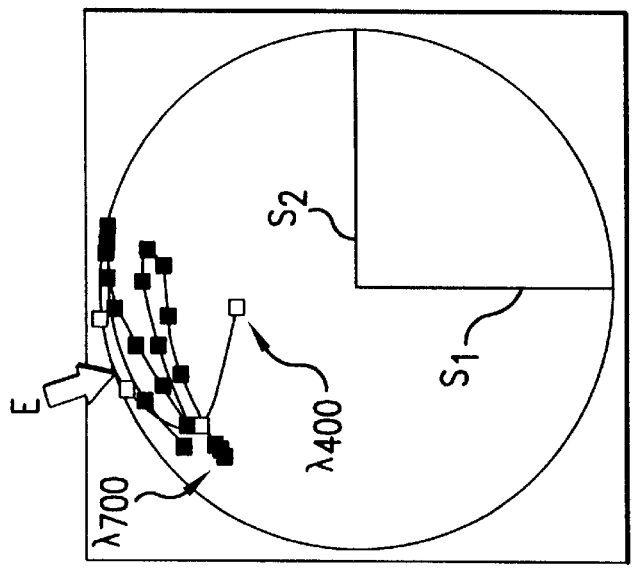
FIG. 24 is a diagram of Poincarè sphere in a state of white in Example 2.
Figure 24A:
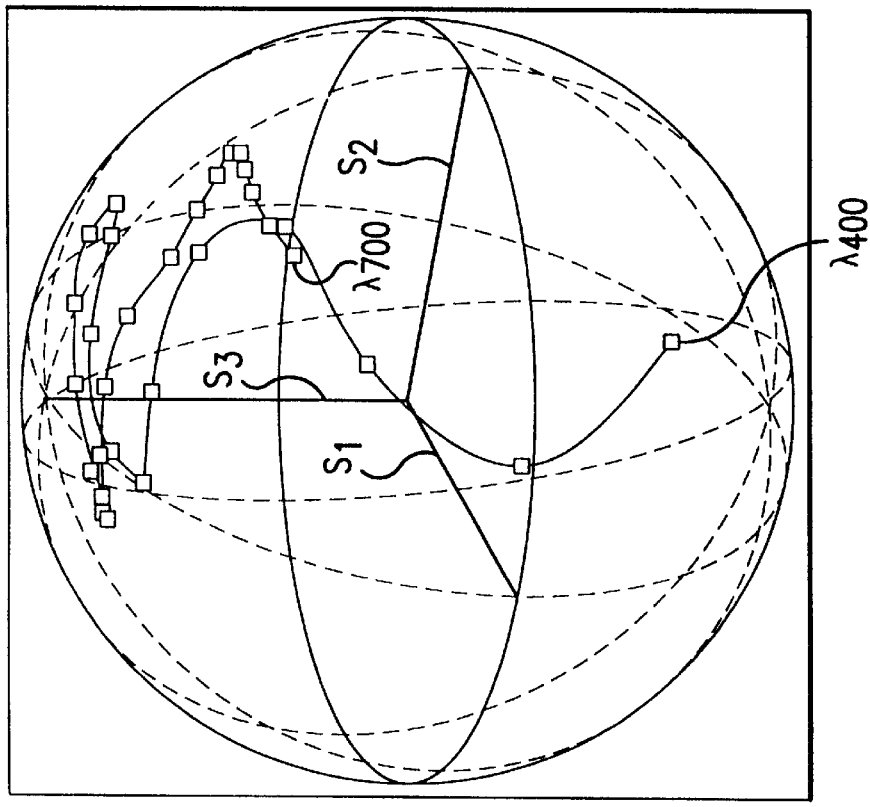
Figure 25B:
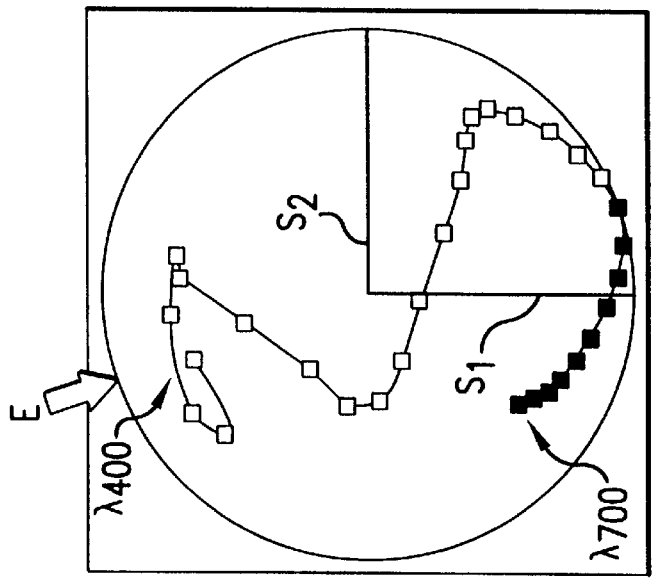
FIG. 25 is a diagram of Poincarè sphere in a state of blue in Example 2.
Figure 25A:
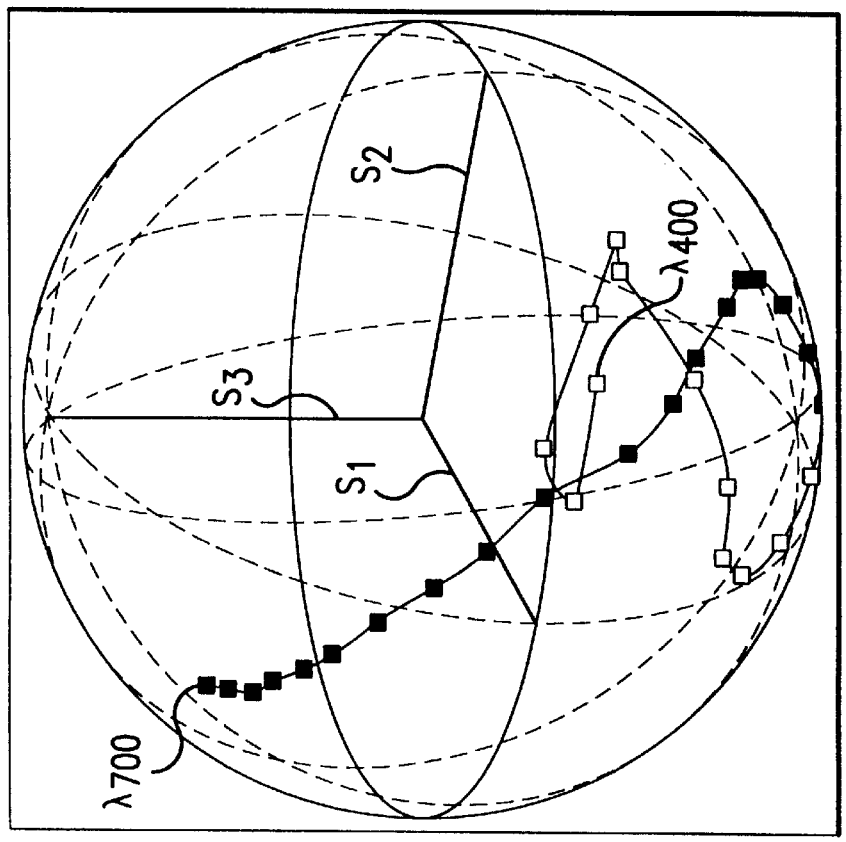
Figure 26B:
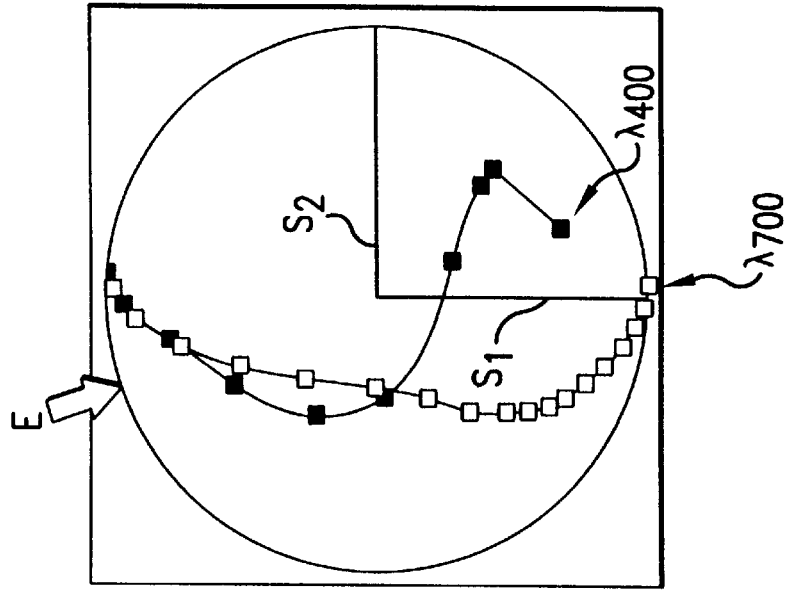
FIG. 26 is a diagram of Poincarè sphere in a state of green in Example 2.
Figure 26A:
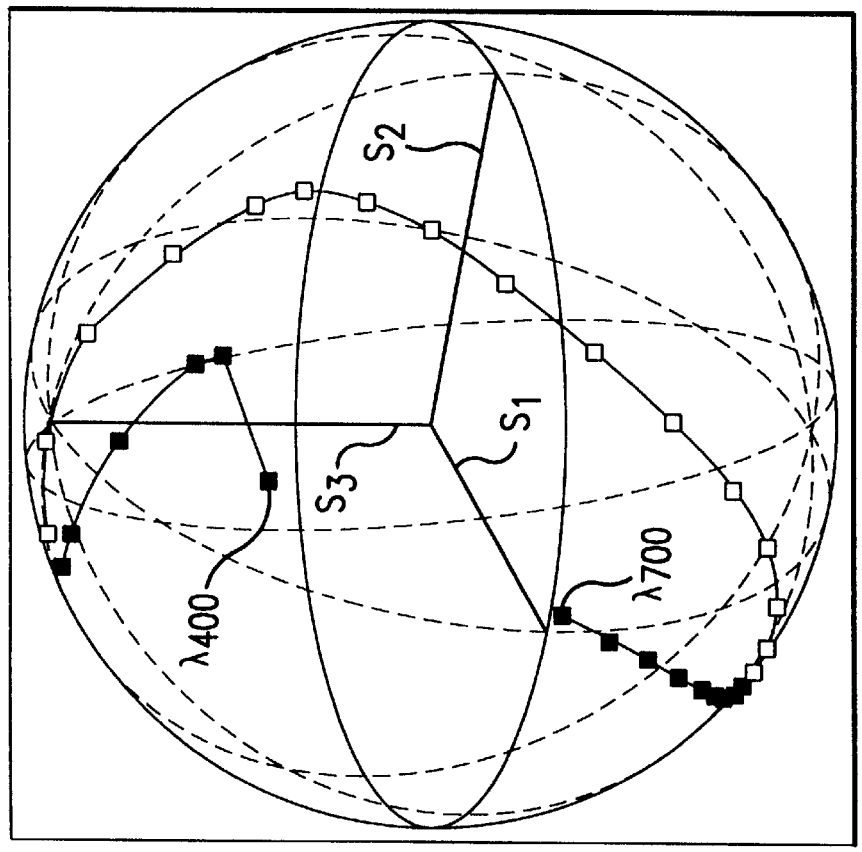
Figure 27B:
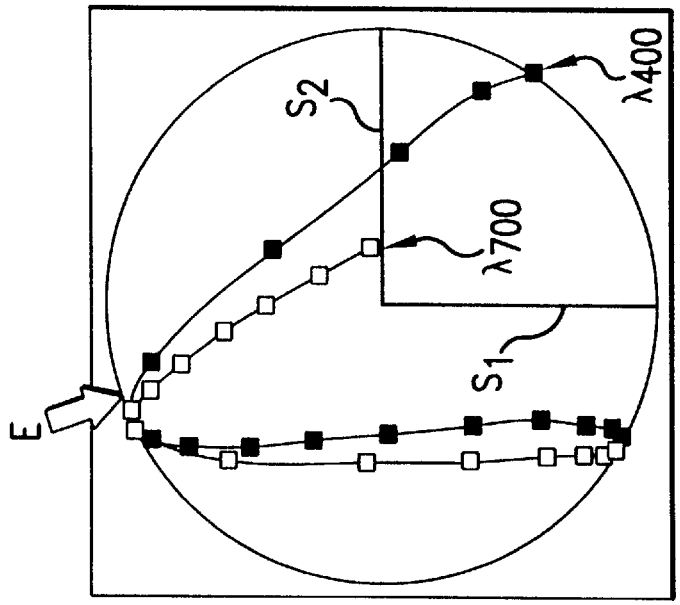
FIG. 27 is a diagram of Poincarè sphere in a state of red in Example 2.
Figure 27A:
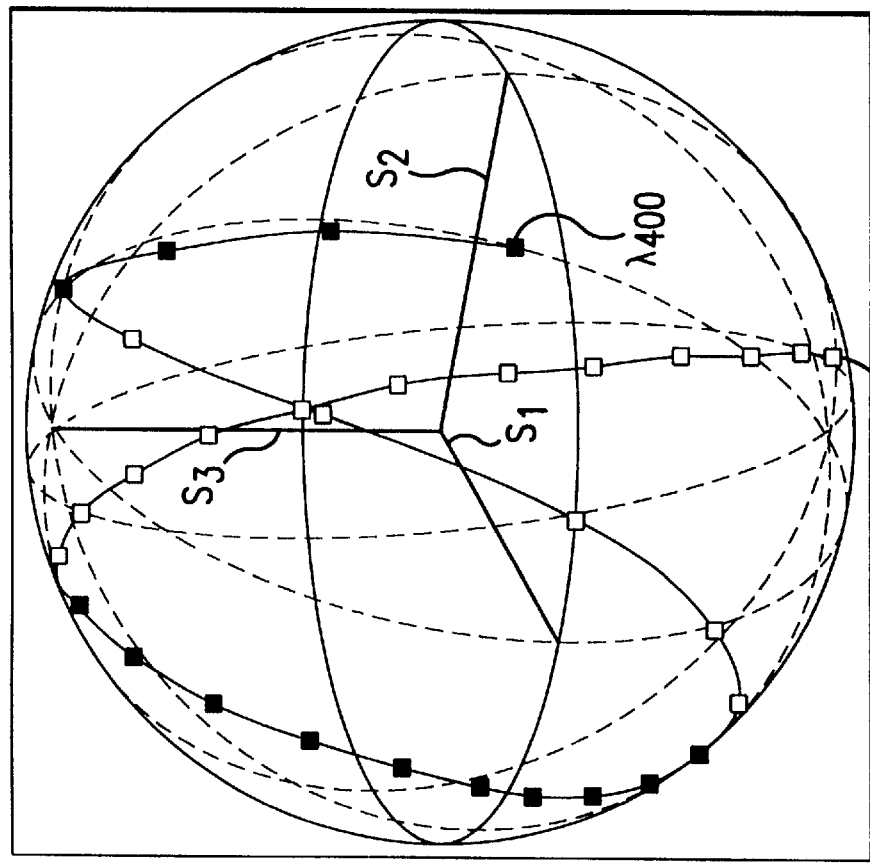

In the same manner, description will be made with reference to Example 2 of the present invention. A state in the application of $V_{OFF}$ is shown in FIG. 24. It is understood that the lights of wavelength in a range of about 400 nm–700 nm are collected to a limited area. Upon the application of intermediate voltages, the state is shifted to the states as shown in FIG. 25 and FIG. 26. Upon the application of $V_{ON}$, the state shown in FIG. 27 is obtained. It is understood that in the states of FIG. 25, 26 and 27, there is a wide distribution of lights of wavelength from 400 nm–700 nm.

In the change from the state of FIG. 24 to the state of FIG. 25, the lights of shorter wavelength are shifted to the opposite side with respect to the center. However, the lights of longer wavelength still remain at the state of $V_{OFF}$. In the change to the states of FIGS. 26 and 27, there is found a further wide distribution. When a polarizing plate is disposed at the position of arrow mark E, a white display is obtainable in the state of FIG. 24; a blue display is obtainable in the state of FIG. 25; a green display is obtainable in the state of FIG. 26 and a red display is obtainable in the state of FIG. 27.

Thus, the conventional cell structure provides preferred conditions to display a monochrome color or a gray color. However, the cell structure disclosed of the present invention provides the optimum conditions for a display of white, red, blue and green.

According to the present invention, several kinds of colors can be displayed by a single pixel without using color filters. Accordingly, when the color liquid crystal display element of the present invention is used as a transparent type, very bright light can be presented. Further, since the display element minimizes power consumption for a backlight, energy can be saved. And it is suitable for a portable type. Further, since a bright display is obtainable, it is usable for a reflection type color liquid crystal display apparatus wherein a reflecting plate is used. A backlight is no longer necessary.

When the display apparatus of the present invention is used as a reflection type, the color purity is improved since visible light twice passes through the color liquid crystal display element. For instance, in a case that a red color light passes through the liquid crystal display element, visible light is first passed through a red filter to provide a red color light, and the red color light is reflected by a reflecting plate, and is again passed through the red filter to reach human eyes. Namely, the purity of the red color is increased by twice passing the visible light through the red filters. Accordingly, when the present invention is used as the reflection type, the characteristics of the color liquid crystal display apparatus of the present invention can effectively be utilized. In this case, when silver is used as a material for the reflecting plate, a bright color display is obtainable in association with its high reflective power.

Further, a semi-transparent reflecting plate may be used together with a backlight such as EL, CFL or the like which is disposed at the backside.

In the present invention, various applications are possible as far as the effect of the present invention is not reduced.

Embodiments of the present invention will be described in more detail with reference to the drawings.

Figure 2:
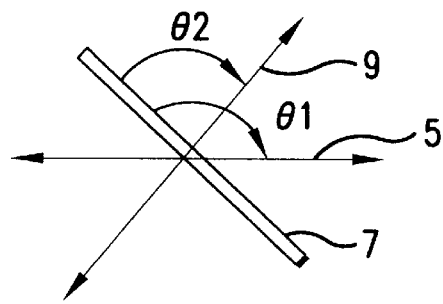
FIG. 2 is a plan view showing a relative position of the direction of the long axis of an upper side liquid crystal molecule, the direction of the absorbing axis of a polarizing plate and the direction of the slow axis of a birefringent plate in a case that the liquid crystal display apparatus of the present invention is watched from the top.
Figure 3:
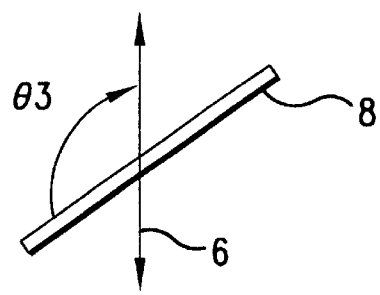
FIG. 3 is a plan view showing a relative position of the direction of the long axis of a lower side liquid crystal molecule and the direction of the absorbing axis of a polarizing plate in a case that the liquid crystal display apparatus of the present invention is watched from the top.

FIG. 1 is a perspective view showing in a form of a model the color liquid crystal display apparatus according to the present invention. FIG. 2 is a plan view showing a relation of the direction of the absorbing axis of an upper side polarizing plate, the direction of the slow axis of a birefringent plate comprising a plurality of films and the direction of the long axis of a liquid crystal molecule at an upper side of a liquid crystal layer in a case that the color liquid crystal display apparatus in FIG. 1 is watched from the top. FIG. 3 is a plan view showing a relation of the direction of the absorbing axis of a lower side polarizing plate and the direction of the long axis of a liquid crystal molecule at a lower side of the liquid crystal layer in the same state as in FIG. 2.

In FIG. 1, numerals 1 and 2 designate a pair of polarizing pates; numeral 3 designates a liquid crystal layer for displaying characters and figures, which contains a nematic liquid crystal of positive dielectric anisotropy having $\Delta n_1 \cdot d_1$ of 1.2 μm–2.5 μm and a twist angle of 160°–300°; numeral 4 designates a birefringent plate disposed on the liquid crystal layer; numeral 5 designates the absorbing axis of the polarizing plate placed at an upper side of the liquid crystal layer; numeral 6 designates the absorbing axis of the polarizing plate at a lower side; numeral 7 designates the direction of the long axis of a liquid crystal molecule at an upper side in the liquid crystal layer (the liquid crystal molecule substantially indicates a direction of orientation); numeral 8 designates the direction of the long axis of a liquid crystal molecule at a lower side in the liquid crystal layer (the direction of the other orientation) and numeral 9 designates an axis (a slow axis) of a birefringent plate comprising a plurality of laminated films.

In FIGS. 2 and 3, $\theta_1$ represents an angle obtained by measuring clockwisely the direction of the absorbing axis 5 of the upper side polarizing plate with respect to the direction of the long axis 7 of the upper side liquid crystal molecule 7 in the liquid crystal layer; $\theta_2$ represents an angle obtained by measuring clockwisely the direction of the axis (the slow axis) of the upper side (i.e. at the side of the polarizing plate) birefringent plate 4 with respect to the direction of the long axis 9 of the upper side liquid crystal molecule 7 in the liquid crystal layer, and $\theta_3$ represents an angle obtained by measuring clockwisely the direction of the absorbing axis 6 of the lower side polarizing plate with respect to the direction of the long axis of the lower side liquid crystal molecule 8 in the liquid crystal layer.

The birefringent plate used in the present invention has different refractive indices in three directions of x, y and z. In determining the three directions, the direction having a larger refractive index in the film plane of the birefringent plate is to be an x axis, the direction having a smaller refractive index is to be a y axis and the direction of thickness is to be a z axis. The refractive indices of the x, y and z axis are respectively $n_X$, $n_Y$ and $n_Z$ wherein $n_X > n_Y$ and $\Delta n_2 = n_X - n_Y$. In embodiments described in this specification, $n_X \geq n_Z \geq n_Y$. $d_2$ represents the thickness of the birefringent plate. There is a relation of $N_Z = (n_X - n_Z)/(n_X - n_Y)$.

In the present invention, values of $\theta_1$, $\theta_2$ and $\theta_3$, $\Delta n_1 \cdot d_1$ of the liquid crystal layer, the twist angle of the liquid crystal layer, $\Delta n_2 \cdot d_2$ of the birefringent plate and $N_Z$ are optimized. When the optimized values are determined, there is obtainable a color display apparatus having a wide viewing angle wherein a display of substantially achromatic color when no voltage is applied and a display of red, blue and green colors when a voltage is applied, can be achieved.

In Examples described hereinbelow, liquid crystal layers of left helical structure are used. However, liquid crystal layers of right helical structure may be used. Even in this case, the same colored display as in a case of the left helical structure can be easily obtained by determining the relations of angles of $\theta_1$, $\theta_2$ and $\theta_3$ with respect to the directions of the long axis of liquid crystal molecules in the liquid crystal layer, the direction of the polarizing axis of the polarizing plates and the direction of the slow axis of the birefringent plate in the counter-clockwise direction.

A liquid crystal cell was formed as described hereinbelow. An ITO transparent electrode was formed on each glass substrate to be in a form of a stripe by patterning. An insulating layer is formed on the ITO transparent electrode. Further, an overcoating layer of polyimide was formed on the insulating layer, followed by rubbing it to form an aligning layer, whereby a substrate was produced. The circumferential portion of two substrates thus produced were sealed with a sealing material to thereby form the liquid crystal cell. A nematic liquid crystal of positive dielectric anisotropy was injected into the liquid crystal cell. The injection port was sealed with a sealing material. Several examples will be described in detail.

EXAMPLE 1

The refractive index anisotropy $\Delta n_1$ of the liquid crystal and the thickness $d_1$ of the liquid crystal layer were adjusted so that $\Delta n_1 \cdot d_1$ of the liquid crystal layer was 1.35 μm. Further, determination was so made that $\Delta n_2 \cdot d_2$ of the birefringent plate was 1.46 μm, the twist angle of the liquid crystal layer was 240°, $\theta_1=140°$, $\theta_2=100°$ and $\theta_3=135°$. Further, determination of the physical property values of the liquid crystal was so made that $\Delta n_1=0.206$ and viscosity η=16.8 cSt (ambient temperature $T_a=20°$ C.). Further, $N_Z=0.6$ was determined.

The liquid crystal cell was driven to provide a 8 gradation display at a 1/200 duty ratio. A result is shown in chromaticity diagram of FIG. 4 wherein a display of bright white, orange red, dark blue and green could be provided as the applied effective voltage increases. In this case, the viewing angle became wide in comparison with a case of using an uniaxial birefringent plate.

Further, a reflecting plate was used. As a result, a reflection type color liquid crystal display apparatus having excellent color purity and wide viewing angle could be provided. Table 1 shows coordinate data according to the chromaticity diagram. The colors contain noises resulted from portions between lines where no pixels are formed, of a dot matrix type display element having an aperture rate of about 80%, and the colors substantially correspond to actually recognized colors. The developed colors (color purities) produced from pixel portions have values about 30% better than the values of data in Table 1.

TABLE 1

| V | Transmittance | x | y | V | Transmittance | x | y |
| --- | --- | --- | --- | --- | --- | --- | --- |
| 2.40 | 29.479 | 0.310 | 0.343 | 2.61 | 12.493 | 0.239 | 0.252 |
| 2.41 | 29.701 | 0.312 | 0.343 | 2.62 | 13.473 | 0.226 | 0.262 |
| 2.42 | 29.931 | 0.313 | 0.343 | 2.63 | 14.508 | 0.220 | 0.278 |
| 2.43 | 30.121 | 0.314 | 0.343 | 2.64 | 15.658 | 0.219 | 0.296 |
| 2.44 | 30.179 | 0.316 | 0.343 | 2.65 | 16.696 | 0.220 | 0.316 |
| 2.45 | 30.249 | 0.318 | 0.344 | 2.66 | 17.653 | 0.224 | 0.335 |
| 2.46 | 30.173 | 0.321 | 0.345 | 2.267 | 18.458 | 0.228 | 0.351 |
| 2.47 | 29.986 | 0.325 | 0.346 | 2.68 | 19.186 | 0.233 | 0.365 |
| 2.48 | 29.636 | 0.330 | 0.349 | 2.69 | 19.753 | 0.239 | 0.377 |
| 2.49 | 29.09 | 0.336 | 0.352 | 2.70 | 20.238 | 0.243 | 0.387 |
| 2.50 | 28.095 | 0.344 | 0.357 | 2.71 | 20.672 | 0.248 | 0.395 |
| 2.51 | 26.788 | 0.354 | 0.362 | 2.72 | 20.971 | 0.253 | 0.401 |
| 2.52 | 25.047 | 0.366 | 0.369 | 2.73 | 21.312 | 0.256 | 0.406 |
| 2.53 | 22.907 | 0.379 | 0.375 | 2.74 | 21.587 | 0.259 | 0.409 |
| 2.54 | 20.519 | 0.390 | 0.377 | 2.75 | 21.748 | 0.262 | 0.412 |
| 2.55 | 17.984 | 0.395 | 0.370 | 2.76 | 21.946 | 0.265 | 0.413 |
| 2.56 | 15.542 | 0.387 | 0.351 | 2.77 | 22.11 | 0.267 | 0.415 |
| 2.57 | 13.655 | 0.364 | 0.321 | 2.78 | 22.226 | 0.269 | 0.416 |
| 2.58 | 12.293 | 0.326 | 0.286 | 2.79 | 22.364 | 0.271 | 0.418 |
| 2.59 | 11.715 | 0.289 | 0.261 | 2.80 | 22.409 | 0.273 | 0.418 |
| 2.60 | 11.86 | 0.259 | 0.251 | | | | |

A picture of 320×400 dots was displayed. A graph was displayed by using the color liquid crystal display apparatus of the above-mentioned embodiment. In the graph, the background color was white and three colors of red, blue and green were used for displaying bar graphs. The visibility could be remarkably improved. Further, in a displaying day scheduling, an important meeting was indicated by red to attract attention. Further, in display for calender, Saturday and Sunday were indicated by red, weekdays were indicated by blue, and the day corresponding to today was indicated by green. In this case, white was used as the background color.

Sentences were also displayed. White was used as the background color and characters were indicated by blue. A red-colored marking was used for a block in the sentences. The title was indicated by a green color and underlined portions were indicated by green or red.

Further, as a graphic display, white, red, blue and green were used. Many intermediate voltages were used to display pink, purple and bluish green colors whereby a human face could be expressed and the background could be displayed with several kinds of color.

Thus, the color liquid crystal display apparatus according to this example could present an environment of good visibility and good workability in comparison with a display apparatus capable of exhibiting a simple monochrome display.

When the liquid crystal display element was driven under conditions of a 1/100 duty ratio and 4 frame gradations, bright white could be obtained in a state of $V_{OFF}$ and orange red and dark blue could be displayed as an applied voltage is increased. A green display could be provided in a state of $V_{ON}$.

EXAMPLE 2

The refractive index anisotropy $\Delta n_1$ of the liquid crystal and the thickness $d_1$ of the liquid crystal layer were so adjusted that $\Delta n_1 \cdot d_1$ of the liquid crystal layer was 1.7 μm. Determination was made so that $\Delta n_2 \cdot d_2$ of the birefringent plate was 1.8 μm, the twist angle of the liquid crystal layer was 240°, $\theta_1=150°$, $\theta_2=95°$ and $\theta_3=135°$. The physical property values of the liquid crystal were so determined that $\Delta n=0.206$ and the viscosity η=15.1 cSt($T_a=20°$ C.). Further, $N_Z=0.6$.

Figure 5:
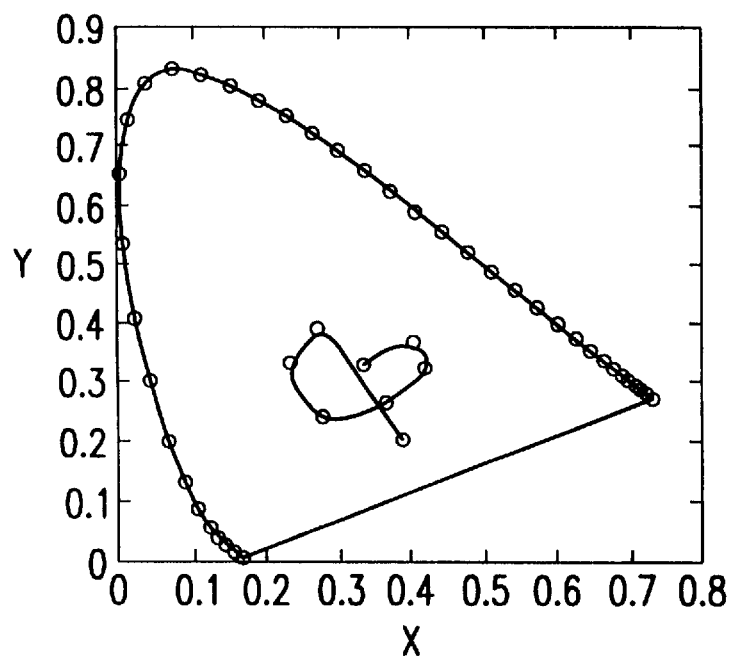
FIG. 5 is a chromaticity diagram of color change vs voltage in Example 2.

The liquid crystal display element was driven to exhibit 8 gradations at a 1/64 duty ratio. A result is shown in the chromaticity diagram of FIG. 5 wherein a display of bright white, orange red, blue, green and pinkish red could be presented as an applied effective voltage was increased. Further, the viewing angle was increased in comparison with a case of using a uniaxial birefringent plate. When a reflecting plate was used, a reflection type color liquid crystal display apparatus having excellent color purity and a wide viewing angle could be provided.

A display was conducted by using 256×128 dots. In this example, a bar graph display, a day schedule display, a sentence display and a graphic display were carried out in the same manner as those in Example 1. Table 2 shows coordinate data according to the chromaticity diagram of this example. In this example, in particular, the color development of a pink color, which has not been able to obtain in the conventional technique, could be provided.

TABLE 2

| V | Transmittance | x | y | V | Transmittance | x | y |
| --- | --- | --- | --- | --- | --- | --- | --- |
| 2.00 | 31.388 | 0.324 | 0.358 | 2.26 | 18.977 | 0.356 | 0.305 |
| 2.01 | 31.508 | 0.324 | 0.356 | 2.27 | 18.231 | 0.355 | 0.293 |
| 2.02 | 31.685 | 0.324 | 0.354 | 2.28 | 17.714 | 0.354 | 0.285 |
| 2.03 | 31.811 | 0.324 | 0.352 | 2.29 | 17.316 | 0.353 | 0.280 |
| 2.04 | 31.641 | 0.324 | 0.350 | 2.30 | 16.927 | 0.352 | 0.276 |
| 2.05 | 31.562 | 0.325 | 0.349 | 2.31 | 16.685 | 0.352 | 0.273 |
| 2.06 | 31.247 | 0.327 | 0.347 | 2.32 | 16.484 | 0.352 | 0.271 |
| 2.07 | 30.723 | 0.329 | 0.346 | 2.33 | 16.351 | 0.353 | 0.271 |
| 2.08 | 29.87 | 0.332 | 0.344 | 2.34 | 16.244 | 0.353 | 0.270 |
| 2.09 | 28.595 | 0.337 | 0.345 | 2.35 | 16.167 | 0.353 | 0.269 |

TABLE 2-continued

| V | Transmittance | x | y | V | Transmittance | x | y |
|---|---|---|---|---|---|---|---|
| 2.10 | 26.636 | 0.345 | 0.347 | 2.36 | 16.084 | 0.354 | 0.268 |
| 2.11 | 24.267 | 0.355 | 0.350 | 2.37 | 16.006 | 0.354 | 0.269 |
| 2.12 | 21.025 | 0.369 | 0.355 | 2.38 | 15.995 | 0.355 | 0.268 |
| 2.13 | 17.648 | 0.382 | 0.358 | 2.39 | 16.029 | 0.356 | 0.269 |
| 2.14 | 14.304 | 0.380 | 0.349 | 2.40 | 15.994 | 0.356 | 0.268 |
| 2.15 | 12.117 | 0.343 | 0.318 | 2.41 | 16.012 | 0.357 | 0.269 |
| 2.16 | 11.962 | 0.279 | 0.280 | 2.42 | 16.018 | 0.357 | 0.268 |
| 2.17 | 14.344 | 0.237 | 0.275 | 2.43 | 16.054 | 0.357 | 0.269 |
| 2.18 | 18.245 | 0.230 | 0.308 | 2.44 | 16.053 | 0.358 | 0.269 |
| 2.19 | 22.275 | 0.252 | 0.365 | 2.45 | 16.012 | 0.358 | 0.269 |
| 2.20 | 24.353 | 0.289 | 0.414 | 2.46 | 16.088 | 0.359 | 0.269 |
| 2.21 | 24.741 | 0.326 | 0.431 | 2.47 | 16.183 | 0.359 | 0.269 |
| 2.22 | 23.857 | 0.350 | 0.413 | 2.48 | 16.127 | 0.359 | 0.270 |
| 2.23 | 22.537 | 0.359 | 0.380 | 2.490 | 16.187 | 0.359 | 0.270 |
| 2.24 | 21.130 | 0.360 | 0.348 | 2.500 | 16.211 | 0.360 | 0.270 |
| 2.25 | 19.919 | 0.359 | 0.323 | | | | |

EXAMPLE 3

The refractive index anisotropy $\Delta n_1$ of the liquid crystal and the thickness $d_1$ of the liquid crystal layer were so adjusted that $\Delta n_1 \cdot d_1$ of the liquid crystal layer was 1.71 μm. Determination was so made that $\Delta n_2 \cdot d_2$ of the birefringent plate was 1.80 μm, the twist angle of the liquid crystal layer was 240°, $\theta_1=155°$, $\theta_2=100°$ and $\theta_3=135°$. As the physical property values of the liquid crystal used, $\Delta n=0.211$ and the viscosity $\eta=14.9$ cSt ($T_a=2°$ C.). Further, $N_Z=0.5$.

The liquid crystal display element was driven for an 8 gradation display at 1/200 duty. As a result, a display of bright white, orange red, dark blue and bright green could be provided as an applied effective voltage was increased. The viewing angel could be increased in comparison with a case of using an uniaxial birefringent plate. When a reflecting plate was provided, a reflection type color liquid crystal display having excellent color purity and a wide viewing angle could be provided.

EXAMPLE 4

The refractive index anisotropy $\Delta n_1$ of the liquid crystal and the thickness $d_1$ of the liquid crystal layer were adjusted that $\Delta n_1 \cdot d_1$ of the liquid crystal layer was 2.06 μm. Determination was made so that $\Delta n_2 \cdot d_2$ of the birefringent plate was 2.10 μm, the twist angle of the liquid crystal layer was 240°, $\theta_1=140°$, $\theta_2=95°$ and $\theta_3=135°$. The liquid crystal composition of the same physical property values as in Example 1 was used, further, $N_Z=0.5$ was determined.

The liquid crystal display element was driven for an 8 gradation display at 1/200 duty. As a result, a display of bright white, dark blue, bright green and pinkish red could be provided as an applied effective voltage was increased. Also, the viewing angle was increased in comparison with a case of using an uniaxial birefringent plate. When a reflecting plate is provided, a reflection type color liquid crystal display of good color purity and wide viewing angle could be obtained.

EXAMPLE 5

The refractive index anisotropy $\Delta n_1$ of the liquid crystal and the thickness $d_1$ of the liquid crystal layer were so adjusted that $\Delta n_1 \cdot d_1$ of the liquid crystal layer was 2.06 μm. Determination was made so that $\Delta n_2 \cdot d_2$ of the birefringent plate was 1.78 μm, the twist angle of the liquid crystal layer was 240°, $\theta_1=40°$, $\theta_2=85°$ and $\theta_3=135°$.

The liquid crystal of the same physical property values as in Example 1 was used. Further, $N_Z=0.7$ was determined.

The liquid crystal display element was driven for an 8 gradation display at 1/200 duty. As a result, a display of bright white, the dark blue, bright green and pinkish red could be provided as an applied effective voltage was increased. Further, the viewing angle was increased in comparison with a case of using an uniaxial birefringent plate. When a reflecting plate is provided, a reflection type color liquid crystal display of good color purity and wide viewing angle could be provided.

EXAMPLE 6

The refractive index anisotropy $\Delta n_1$ of the liquid crystal and the thickness $d_1$ of the liquid crystal layer were so adjusted that $\Delta n_1 \cdot d_1$ of the liquid crystal layer was 2.06 μm. Determination was made so that $\Delta n_2 \cdot d_2$ of the birefringent plate was 1.40 μm, the twist angle of the liquid crystal layer was 240°, $\theta_1=130°$, $\theta_2=85°$ and $\theta_3=135°$.

The liquid crystal of the same physical property values as in Example 1 was used. Further, $N_Z=0.3$ was determined.

The liquid crystal display element was driven for an 8 gradation display at 1/200 duty. As a result, a display of bright white, the dark blue, bright green and pinkish red could be provided as an applied effective voltage was increased. Further, the viewing angle was increased in comparison with a case of using an uniaxial birefringent plate. When a reflecting plate is provided, a reflection type color liquid crystal display of good color purity and wide viewing angle could be provided.

EXAMPLE 7

The refractive index anisotropy $\Delta n_1$ of the liquid crystal and the thickness $d_1$ of the liquid crystal layer were so adjusted that $\Delta n_1 \cdot d_1$ of the liquid crystal layer was 1.78 μm. Determination was made so that $\Delta n_2 \cdot d_2$ of the birefringent plate was 1.87 μm, the twist angle of the liquid crystal layer was 240°, $\theta_1=150°$, $\theta_2=95°$ and $\theta_3=135°$. The liquid crystal of the same physical property values as in Example 1 was used. Further, $N_Z=0.5$ was determined.

The liquid crystal display element was driven for an 8 gradation display at 1/128 duty. As a result, a display of bright white, dark blue, bright green and pinkish red could be provided as an applied effective voltage was increased. Further, the viewing angle was increased in comparison with a case of using a uniaxial birefringent plate. When a reflecting plate is provided, a reflection type color liquid crystal display of good color purity and wide viewing angel could be provided.

EXAMPLE 8

The refractive index anisotropy $\Delta n_1$ of the liquid crystal and the thickness $d_1$ of the liquid crystal layer were so adjusted that $\Delta n_1 \cdot d_1$ of the liquid crystal layer was 2.42 μm. Determination was made so that $\Delta n_2 \cdot d_2$ of the birefringent plate was 2.36 μm, the twist angle of the liquid crystal layer was 240°, $\theta_1=135°$, $\theta_2=85°$ and $\theta_3=135°$. The liquid crystal of the same physical property values as in Example 1 was used. Further, $N_Z=0.5$ was determined.

The liquid crystal display element was driven for an 8 gradation display at 1/200 duty. As a result, a display of bright white, dark blue, bright green and pinkish red could be provided as an applied effective voltage was increased. Further, the viewing angle was increased in comparison with a case of using an uniaxial birefringent plate.

When a reflecting plate was provided, a reflection type color liquid crystal display of good color purity and wide viewing angle could be provided.

COMPARATIVE EXAMPLE 1

The refractive index anisotropy $\Delta n_1$ of the liquid crystal and the thickness $d_1$ of the liquid crystal layer were so adjusted that $\Delta n_1 \cdot d_1$ of the liquid crystal layer was 1.70 µm. Determination was made so that $\Delta n_2 \cdot d_2$ of the birefringent plate was 1.29 µm, the twist angle of the liquid crystal layer was 240°, $\theta_1=150°$, $\theta_2=100°$ and $\theta_3=135°$. The liquid crystal of the same physical property values as in Example 1 was used. Further, $N_Z=0.5$ was determined.

The liquid crystal display element was driven for an 8 gradation display at 1/64 duty. As a result, a display of black, white and red could be provided as an applied effective voltage was increased. Further, the viewing angle was increased in comparison with a case of using an uniaxial birefringent plate.

When a reflecting plate was disposed, a reflection type color liquid crystal display of good color purity and wide viewing angle could be provided.

EXAMPLE 9–16

The uniaxial type birefringent plate was selected. That is $n_X > n_Y = n_Z$ type one. Each example of Examples from 9 to 16 has the same conditions of each Examples from 1 to 8 except $N_Z$ value.

As a result, a display of four colors (at least four colors, White→Red→Blue→Green(→Pinkish Red)) could be provided as an applied effective voltage was increased.

The viewing angle was decreased in comparison with a case of using the biaxial birefringent plate. When a reflecting plate was disposed, a reflection type color liquid crystal display of good color purity could be provided.

Table 3 shows results of Examples 1 through 16 and Comparative Examples 1 and 2. In Table 3, a relation such as $W_1 > W_2$ exist on good performance of white. Further, coordinate data of before-mentioned Poincaré sphere are shown in Tables 4 through 13, which respectively correspond to FIG. 18 through 27.

TABLE 4

| | λ | S1 | S2 | S3 |
|---|---|---|---|---|
| 1 | 400 | −0.90363 | 0.39085 | −0.1752 |
| 2 | 410 | −0.90917 | 0.41505 | 0.03385 |
| 3 | 420 | −0.93178 | 0.28645 | 0.22302 |
| 4 | 430 | −0.95266 | 0.03505 | 0.302 |
| 5 | 440 | −0.93094 | −0.21515 | 0.29507 |
| 6 | 450 | −0.85362 | −0.43757 | 0.28262 |
| 7 | 460 | −0.75801 | −0.60101 | 0.25337 |
| 8 | 470 | −0.65262 | −0.71025 | 0.26386 |
| 9 | 480 | −0.55617 | −0.76323 | 0.32887 |
| 10 | 490 | −0.51119 | −0.7693 | 0.38322 |
| 11 | 500 | −0.48808 | −0.74101 | 0.46117 |
| 12 | 510 | −0.49908 | −0.67902 | 0.53838 |
| 13 | 520 | −0.55287 | −0.59684 | 0.58148 |
| 14 | 530 | −0.61119 | −0.50491 | 0.60952 |
| 15 | 540 | −0.66767 | −0.41586 | 0.61748 |
| 16 | 550 | −0.73191 | −0.3036 | 0.61003 |
| 17 | 560 | −0.8 | −0.19818 | 0.56633 |
| 18 | 570 | −0.84652 | −0.10412 | 0.52207 |
| 19 | 580 | −0.8815 | 0.00413 | 0.47217 |
| 20 | 590 | −0.90418 | 0.09709 | 0.41596 |
| 21 | 600 | −0.90786 | 0.18029 | 0.37853 |
| 22 | 620 | −0.91049 | 0.26898 | 0.31411 |
| 23 | 620 | −0.89892 | 0.33397 | 0.28355 |
| 24 | 630 | −0.87862 | 0.40864 | 0.24706 |
| 25 | 640 | −0.85669 | 0.46498 | 0.22333 |
| 26 | 650 | −0.82729 | 0.52443 | 0.20139 |
| 27 | 660 | −0.8034 | 0.56644 | 0.18357 |
| 28 | 670 | −0.77476 | 0.60833 | 0.17225 |
| 29 | 680 | −0.75224 | 0.63517 | 0.17517 |
| 30 | 690 | −0.72651 | 0.66459 | 0.17466 |
| 31 | 700 | −0.70389 | 0.68716 | 0.17984 |

TABLE 3

| Example | Liquid crystal twist angle | Liquid crystal $\Delta n_1 \cdot d_1$ | Birefringent plate $\Delta n_2 \cdot d_2$ | $N_Z$ | $\theta_1$ | $\theta_2$ | $\theta_3$ | Major color development and sequence | Duty ratio |
|---|---|---|---|---|---|---|---|---|---|
| 1 | 240 | 1.35 | 1.46 | 0.6 | 140 | 100 | 135 | $W_1$-OR-DB-B-<u>G</u> | 1/200 |
| 2 | 240 | 1.7 | 1.8 | 0.6 | 150 | 95 | 135 | $W_1$-OR-B-G-<u>PR</u> | 1/64 |
| 3 | 240 | 1.71 | 1.80 | 0.5 | 155 | 100 | 135 | $W_1$-OR-DB-<u>BG</u> | 1/200 |
| 4 | 240 | 2.06 | 2.10 | 0.5 | 140 | 95 | 135 | $W_1$-DB-BG-<u>PR</u> | 1/200 |
| 5 | 240 | 2.06 | 1.78 | 0.7 | 40 | 85 | 135 | $W_2$-DB-BG-<u>PR</u> | 1/200 |
| 6 | 240 | 2.06 | 1.40 | 0.3 | 130 | 85 | 135 | $W_2$-DB-BG-<u>PR</u> | 1/200 |
| 7 | 240 | 1.78 | 1.87 | 0.5 | 150 | 95 | 135 | $W_1$-DB-BG-<u>PR</u> | 1/128 |
| 8 | 240 | 2.42 | 2.36 | 0.5 | 135 | 85 | 135 | $W_2$-DB-BG-<u>PR</u> | 1/200 |
| Comparative Example 1 | 240 | 1.70 | 1.29 | 0.5 | 150 | 100 | 135 | Black-White-Red | 1/64 |
| 9 | 240 | 1.35 | 1.46 | 1.0 | 140 | 100 | 135 | $W_1$-OR-DB-B-<u>G</u> | 1/200 |
| 10 | 240 | 1.7 | 1.8 | 1.0 | 150 | 95 | 135 | $W_1$-OR-B-G-<u>PR</u> | 1/64 |
| 11 | 240 | 1.71 | 1.80 | 1.0 | 155 | 100 | 135 | $W_1$-OR-DB-<u>BG</u> | 1/200 |
| 12 | 240 | 2.06 | 2.10 | 1.0 | 140 | 95 | 135 | $W_1$-DB-BG-<u>PR</u> | 1/200 |
| 13 | 240 | 2.06 | 1.78 | 1.0 | 40 | 85 | 135 | $W_2$-DB-BG-<u>PR</u> | 1/200 |
| 14 | 240 | 2.06 | 1.40 | 1.0 | 130 | 85 | 135 | $W_2$-DB-BG-<u>PR</u> | 1/200 |
| 15 | 240 | 1.78 | 1.87 | 1.0 | 150 | 95 | 135 | $W_1$-DB-BG-<u>PR</u> | 1/128 |
| 16 | 240 | 2.42 | 2.36 | 1.0 | 135 | 85 | 135 | $W_2$-DB-BG-<u>PR</u> | 1/200 |
| Comparative Example 2 | 240 | 1.70 | 1.29 | 1.0 | 150 | 100 | 135 | Black-White-Red | 1/64 |

Note: Colors
OR: orange red DB: dark blue B: blue G: green
BG: bright green PR: pinkish red W: brighter white $W_1 > W_2$
Last color development is underlined.
Basic color development sequence "W-OR-DB-B-G-BG-PR"; delicate color change is possible by changing multiplexing-voltages.

TABLE 5

|   | λ | S1 | S2 | S3 |
|---|---|---|---|---|
| 1 | 400 | 0.74176 | −0.34803 | 0.5733 |
| 2 | 410 | 0.70779 | −0.50324 | 0.49577 |
| 3 | 420 | 0.73963 | −0.53374 | 0.40997 |
| 4 | 430 | 0.7831 | −0.49873 | 0.3715 |
| 5 | 440 | 0.82458 | −0.40929 | 0.39058 |
| 6 | 450 | 0.8478 | −0.28069 | 0.44994 |
| 7 | 460 | 0.81067 | −0.14648 | 0.56688 |
| 8 | 470 | 0.74692 | −0.01955 | 0.66463 |
| 9 | 480 | 0.66557 | 0.11733 | 0.73706 |
| 10 | 490 | 0.53937 | 0.22553 | 0.81131 |
| 11 | 500 | 0.42425 | 0.32328 | 0.84587 |
| 12 | 510 | 0.33179 | 0.40797 | 0.85057 |
| 13 | 520 | 0.23441 | 0.47885 | 0.84602 |
| 14 | 530 | 0.15694 | 0.55099 | 0.81962 |
| 15 | 540 | 0.08852 | 0.60391 | 0.79212 |
| 16 | 550 | 0.03783 | 0.6456 | 0.76274 |
| 17 | 560 | 0.00218 | 0.68091 | 0.73236 |
| 18 | 570 | −0.0275 | 0.70976 | 0.70391 |
| 19 | 580 | −0.04919 | 0.7283 | 0.68349 |
| 20 | 590 | −0.05329 | 0.74287 | 0.66732 |
| 21 | 600 | −0.05604 | 0.75222 | 0.65653 |
| 22 | 610 | −0.0691 | 0.75401 | 0.65322 |
| 23 | 620 | −0.06429 | 0.75251 | 0.65543 |
| 24 | 630 | −0.07223 | 0.74758 | 0.66023 |
| 25 | 640 | −0.0703 | 0.73724 | 0.67196 |
| 26 | 650 | −0.08022 | 0.72599 | 0.68301 |
| 27 | 660 | 0.08587 | 0.70846 | 0.70051 |
| 28 | 670 | −0.10441 | 0.69457 | 0.71181 |
| 29 | 680 | −0.11413 | 0.67046 | 0.73311 |
| 30 | 690 | −0.14334 | 0.6476 | 0.74838 |
| 31 | 700 | −0.15635 | 0.62726 | 0.76295 |

TABLE 6

|   | λ | S1 | S2 | S3 |
|---|---|---|---|---|
| 1 | 400 | −0.76054 | 0.04219 | −0.64792 |
| 2 | 410 | −0.74319 | −0.50569 | −0.43812 |
| 3 | 420 | −0.84157 | −0.51763 | −0.15435 |
| 4 | 430 | −0.99278 | −0.11992 | 0.00314 |
| 5 | 440 | −0.96528 | 0.2523 | 0.0677 |
| 6 | 450 | −0.9101 | 0.30713 | 0.27818 |
| 7 | 460 | −0.95218 | 0.03081 | 0.30397 |
| 8 | 470 | −0.91128 | −0.33352 | 0.24153 |
| 9 | 480 | −0.78004 | −0.57636 | 0.24361 |
| 10 | 490 | −0.70452 | −0.66228 | 0.25505 |
| 11 | 500 | −0.74405 | −0.58429 | 0.32404 |
| 12 | 510 | −0.84563 | −0.39447 | 0.35958 |
| 13 | 520 | −0.9518 | −0.16231 | 0.26025 |
| 14 | 530 | −0.98524 | 0.06656 | 0.15773 |
| 15 | 540 | −0.96309 | 0.25393 | 0.08933 |
| 16 | 550 | −0.92373 | 0.37648 | 0.07068 |
| 17 | 560 | −0.90115 | 0.42563 | 0.08227 |
| 18 | 570 | −0.90774 | 0.41019 | 0.0881 |
| 19 | 580 | −0.94245 | 0.33128 | 0.04517 |
| 20 | 590 | −0.98204 | 0.18856 | 0.00719 |
| 21 | 600 | −0.99698 | 0.05869 | −0.05088 |
| 22 | 610 | −0.97369 | −0.08477 | −0.21152 |
| 23 | 620 | −0.92699 | −0.24078 | −0.28761 |
| 24 | 630 | −0.84903 | −0.35006 | −0.39573 |
| 25 | 640 | −0.75503 | −0.47456 | −0.45246 |
| 26 | 650 | −0.65902 | −0.55703 | −0.50539 |
| 27 | 660 | −0.56935 | −0.63603 | −0.52088 |
| 28 | 670 | −0.50213 | −0.68521 | −0.52759 |
| 29 | 680 | −0.44937 | −0.7264 | −0.52001 |
| 30 | 690 | −0.41735 | −0.74297 | −0.52328 |
| 31 | 700 | −0.40066 | −0.75035 | −0.52578 |

TABLE 7

|   | λ | S1 | S2 | S3 |
|---|---|---|---|---|
| 1 | 400 | 0.91091 | 0.39421 | −0.12186 |
| 2 | 410 | 0.7826 | 0.58892 | −0.20179 |
| 3 | 420 | 0.8669 | 0.39513 | −0.30391 |
| 4 | 430 | 0.97975 | −0.01814 | −0.19942 |
| 5 | 440 | 0.95173 | −0.28449 | −0.11519 |
| 6 | 450 | 0.93469 | −0.31883 | −0.15716 |
| 7 | 460 | 0.9897 | −0.1312 | −0.05731 |
| 8 | 470 | 0.9832 | 0.14566 | 0.11002 |
| 9 | 480 | 0.87618 | 0.41251 | 0.24931 |
| 10 | 490 | 0.72375 | 0.57886 | 0.37564 |
| 11 | 500 | 0.62809 | 0.66495 | 0.40416 |
| 12 | 510 | 0.63109 | 0.66221 | 0.40398 |
| 13 | 520 | 0.64258 | 0.57731 | 0.50379 |
| 14 | 530 | 0.64215 | 0.43128 | 0.63375 |
| 15 | 540 | 0.5949 | 0.23702 | 0.76805 |
| 16 | 550 | 0.49984 | 0.03895 | 0.86524 |
| 17 | 560 | 0.35465 | −0.1413 | 0.92426 |
| 18 | 570 | 0.20238 | −0.32316 | 0.92445 |
| 19 | 580 | 0.0945 | 0.46597 | 0.87974 |
| 20 | 590 | 0.03028 | −0.55917 | 0.8285 |
| 21 | 600 | −0.00961 | −0.63212 | 0.77481 |
| 22 | 610 | −0.05924 | −0.6702 | 0.73981 |
| 23 | 620 | −0.08589 | −0.67848 | 0.72958 |
| 24 | 630 | −0.13122 | −0.67311 | 0.72781 |
| 25 | 640 | −0.18751 | −0.64205 | 0.74338 |
| 26 | 650 | −0.27764 | −0.61827 | 0.73529 |
| 27 | 660 | −0.37322 | −0.56128 | 0.7387 |
| 28 | 670 | −0.4806 | −0.52635 | 0.70141 |
| 29 | 680 | 0.59925 | −0.457 | 0.6573 |
| 30 | 690 | −0.70706 | −0.41032 | 0.57593 |
| 31 | 700 | −0.81404 | −0.33293 | 0.47591 |

TABLE 8

|   | λ | S1 | S2 | S3 |
|---|---|---|---|---|
| 1 | 400 | −0.52454 | −0.51869 | 0.67514 |
| 2 | 410 | −0.64607 | −0.49532 | 0.58073 |
| 3 | 420 | −0.83519 | −0.22996 | 0.49958 |
| 4 | 430 | −0.97918 | 0.05607 | 0.1951 |
| 5 | 440 | −0.95443 | 0.29452 | −0.04812 |
| 6 | 450 | −0.90951 | 0.3848 | −0.15723 |
| 7 | 460 | −0.8773 | 0.32875 | −0.34968 |
| 8 | 470 | −0.79799 | 0.17984 | −0.5752 |
| 9 | 480 | −0.63056 | 0.00863 | −0.77609 |
| 10 | 490 | −0.3008 | −0.14831 | −0.94208 |
| 11 | 500 | 0.01283 | −0.29343 | −0.9559 |
| 12 | 510 | 0.23389 | 0.42217 | −0.87582 |
| 13 | 520 | 0.40974 | −0.51059 | −0.75592 |
| 14 | 530 | 0.49208 | −0.56549 | −0.66187 |
| 15 | 540 | 0.55068 | −0.58181 | −0.59853 |
| 16 | 550 | 0.62219 | −0.5609 | −0.54614 |
| 17 | 560 | 0.70579 | −0.5205 | 0.48057 |
| 18 | 570 | 0.79288 | −0.44947 | −0.41148 |
| 19 | 580 | 0.8941 | −0.34515 | −0.2854 |
| 20 | 590 | 0.95089 | −0.2715 | −0.14865 |
| 21 | 600 | 0.98661 | −0.16282 | −0.00928 |
| 22 | 610 | 0.97161 | −0.07839 | 0.22325 |
| 23 | 620 | 0.92961 | 0.00381 | 0.36854 |
| 24 | 630 | 0.82814 | 0.08345 | 0.55427 |
| 25 | 640 | 0.71933 | 0.14221 | 0.67995 |
| 26 | 650 | 0.55975 | 0.20518 | 0.80285 |
| 27 | 660 | 0.41621 | 0.24282 | 0.87625 |
| 28 | 670 | 0.23468 | 0.29406 | 0.92653 |
| 29 | 680 | 0.09092 | 0.32847 | 0.94013 |
| 30 | 690 | −0.08209 | 0.3619 | 0.9286 |
| 31 | 700 | −0.20469 | 0.39311 | 0.89642 |

TABLE 9

|  | λ | S1 | S2 | S3 |
|---|---|---|---|---|
| 1 | 400 | 0.71039 | 0.60101 | −0.36625 |
| 2 | 410 | 0.72986 | 0.67653 | −0.09805 |
| 3 | 420 | 0.79427 | 0.58457 | 0.16555 |
| 4 | 430 | 0.75863 | 0.35367 | 0.54717 |
| 5 | 440 | 0.48242 | 0.03275 | 0.87533 |
| 6 | 450 | 0.11225 | −0.28502 | 0.95193 |
| 7 | 460 | −0.24893 | −0.55058 | 0.7968 |
| 8 | 470 | −0.41068 | −0.72124 | 0.55781 |
| 9 | 480 | −0.43404 | −0.81482 | 0.38429 |
| 10 | 490 | −0.4713 | −0.8519 | 0.22833 |
| 11 | 500 | −0.5106 | −0.85087 | 0.12369 |
| 12 | 510 | −0.57674 | −0.8166 | 0.02317 |
| 13 | 520 | −0.63745 | −0.75162 | −0.16949 |
| 14 | 530 | −0.63885 | −0.66261 | 0.39091 |
| 15 | 540 | −0.56149 | −0.56455 | −0.60499 |
| 16 | 550 | −0.42894 | −0.44346 | −0.787 |
| 17 | 560 | −0.21767 | −0.29381 | 0.93075 |
| 18 | 570 | 0.04109 | −0.16508 | −0.98542 |
| 19 | 580 | 0.27315 | −0.03232 | −0.96143 |
| 20 | 590 | 0.478 | 0.10244 | −0.87237 |
| 21 | 600 | 0.64174 | 0.19223 | −0.74244 |
| 22 | 610 | 0.77664 | 0.30643 | −0.55039 |
| 23 | 620 | 0.85271 | 0.37207 | −0.36666 |
| 24 | 630 | 0.87687 | 0.44545 | −0.18073 |
| 25 | 640 | 0.87022 | 0.49266 | 0.00069 |
| 26 | 650 | 0.83139 | 0.52896 | 0.17026 |
| 27 | 660 | 0.76238 | 0.56208 | 0.32069 |
| 28 | 670 | 0.68302 | 0.5812 | 0.44237 |
| 29 | 680 | 0.58311 | 0.59363 | 0.55461 |
| 30 | 690 | 0.47494 | 0.6023 | 0.64161 |
| 31 | 700 | 0.36363 | 0.6022 | 0.71072 |

TABLE 10

|  | λ | S1 | S2 | S3 |
|---|---|---|---|---|
| 1 | 400 | −0.46034 | −0.08771 | −0.8834 |
| 2 | 410 | −0.59867 | −0.53776 | −0.59365 |
| 3 | 420 | −0.88353 | 0.40535 | −0.23466 |
| 4 | 430 | −0.99828 | −0.05613 | 0.01665 |
| 5 | 440 | −0.95976 | −0.10297 | 0.26126 |
| 6 | 450 | −0.81001 | −0.44502 | 0.38189 |
| 7 | 460 | −0.66206 | −0.61343 | 0.43055 |
| 8 | 470 | −0.65929 | −0.52954 | 0.53378 |
| 9 | 480 | −0.76038 | −0.24311 | 0.60226 |
| 10 | 490 | 0.82121 | 0.01071 | 0.57053 |
| 11 | 500 | −0.80104 | 0.12214 | 0.58601 |
| 12 | 510 | −0.74086 | 0.0673 | 0.66828 |
| 13 | 520 | −0.7238 | −0.12675 | 0.67827 |
| 14 | 530 | −0.67796 | −0.34567 | 0.64881 |
| 15 | 540 | −0.59605 | −0.53155 | 0.60182 |
| 16 | 550 | −0.52059 | −0.62631 | 0.58028 |
| 17 | 560 | −0.50647 | −0.65348 | 0.56254 |
| 18 | 570 | −0.54207 | −0.6125 | 0.57533 |
| 19 | 580 | −0.63924 | −0.5254 | 0.56154 |
| 20 | 590 | −0.74445 | −0.38731 | 0.54386 |
| 21 | 600 | −0.84652 | −0.23589 | 0.47724 |
| 22 | 610 | −0.93063 | −0.10624 | 0.35021 |
| 23 | 620 | −0.9547 | 0.01696 | 0.29707 |
| 24 | 630 | −0.96073 | 0.12317 | 0.24864 |
| 25 | 640 | −0.9569 | 0.18586 | 0.22317 |
| 26 | 650 | −0.95754 | 0.20126 | 0.20645 |
| 27 | 660 | −0.96223 | 0.18311 | 0.20147 |
| 28 | 670 | −0.97611 | 0.13053 | 0.1737 |
| 29 | 680 | −0.98989 | 0.05486 | 0.13077 |
| 30 | 690 | −0.99672 | −0.05093 | 0.06285 |
| 31 | 700 | −0.99038 | −0.13766 | −0.01404 |

TABLE 11

|  | λ | S1 | S2 | S3 |
|---|---|---|---|---|
| 1 | 400 | −0.6475 | −0.25273 | −0.71893 |
| 2 | 410 | −0.52893 | −0.53119 | −0.66186 |
| 3 | 420 | −0.64731 | −0.45592 | 0.61085 |
| 4 | 430 | −0.71648 | −0.09641 | −0.69092 |
| 5 | 440 | −0.69409 | 0.12191 | −0.70949 |
| 6 | 450 | −0.68308 | 0.04586 | −0.72891 |
| 7 | 460 | −0.44237 | −0.12407 | −0.88821 |
| 8 | 470 | −0.20379 | −0.30156 | −0.93141 |
| 9 | 480 | −0.06791 | −0.42624 | −0.90206 |
| 10 | 490 | 0.0559 | −0.40783 | −0.91134 |
| 11 | 500 | 0.13289 | −0.25708 | −0.95721 |
| 12 | 510 | 0.20653 | −0.02858 | −0.97802 |
| 13 | 520 | 0.29585 | 0.21339 | −0.93109 |
| 14 | 530 | 0.3594 | 0.41395 | −0.83635 |
| 15 | 540 | 0.37719 | 0.56151 | −0.73651 |
| 16 | 550 | 0.40283 | 0.6424 | −0.65196 |
| 17 | 560 | 0.46049 | 0.67317 | −0.57861 |
| 18 | 570 | 0.56043 | 0.65263 | −0.50989 |
| 19 | 580 | 0.6921 | 0.59474 | −0.40899 |
| 20 | 590 | 0.7987 | 0.51285 | −0.31474 |
| 21 | 600 | 0.88623 | 0.42449 | −0.18548 |
| 22 | 610 | 0.94809 | 0.31694 | 0.02603 |
| 23 | 620 | 0.96925 | 0.17863 | 0.16923 |
| 24 | 630 | 0.954 | 0.05828 | 0.2941 |
| 25 | 640 | 0.91131 | −0.05216 | 0.40841 |
| 26 | 650 | 0.85325 | −0.17528 | 0.49116 |
| 27 | 660 | 0.80464 | −0.25142 | 0.5379 |
| 28 | 670 | 0.73816 | −0.32301 | 0.59227 |
| 29 | 680 | 0.69353 | −0.37123 | 0.61741 |
| 30 | 690 | 0.63825 | −0.39826 | 0.65881 |
| 31 | 700 | 0.58806 | −0.41501 | 0.69423 |

TABLE 12

|  | λ | S1 | S2 | S3 |
|---|---|---|---|---|
| 1 | 400 | 0.67465 | 0.2469 | 0.69562 |
| 2 | 410 | 0.4309 | 0.46124 | 0.77561 |
| 3 | 420 | 0.39168 | 0.41206 | 0.82267 |
| 4 | 430 | 0.28953 | 0.13083 | 0.94819 |
| 5 | 440 | 0.13587 | −0.22025 | 0.96593 |
| 6 | 450 | 0.03125 | −0.37209 | 0.92767 |
| 7 | 460 | −0.21304 | −0.42003 | 0.88215 |
| 8 | 470 | −0.51358 | −0.32951 | 0.79225 |
| 9 | 480 | −0.75018 | −0.16053 | 0.64145 |
| 10 | 490 | −0.921 | −0.03008 | 0.3884 |
| 11 | 500 | −0.98249 | 0.7214 | 0.17181 |
| 12 | 510 | −0.99257 | 0.10992 | 0.05215 |
| 13 | 520 | −0.98979 | 0.07982 | −0.11807 |
| 14 | 530 | −0.95675 | 0.02291 | −0.29002 |
| 15 | 540 | −0.87475 | −0.08143 | −0.47767 |
| 16 | 550 | −0.71216 | −0.18283 | −0.6778 |
| 17 | 560 | −0.49537 | −0.25973 | −0.82894 |
| 18 | 570 | −0.2549 | −0.30965 | −0.91605 |
| 19 | 580 | 0.00084 | 0.33648 | −0.94169 |
| 20 | 590 | 0.19668 | −0.3755 | −0.90572 |
| 21 | 600 | 0.34203 | −0.4132 | −0.84397 |
| 22 | 610 | 0.48059 | −0.41605 | −0.77197 |
| 23 | 620 | 0.56023 | −0.41503 | −0.71686 |
| 24 | 630 | 0.6373 | −0.39904 | −0.65926 |
| 25 | 640 | 0.69883 | −0.36929 | −0.61258 |
| 26 | 650 | 0.77123 | −0.31548 | −0.55288 |
| 27 | 660 | 0.8373 | −0.2566 | −0.48279 |
| 28 | 670 | 0.90033 | −0.18488 | −0.39399 |
| 29 | 680 | 0.95336 | −0.10342 | −0.28358 |
| 30 | 690 | 0.98799 | −0.03827 | −0.14973 |
| 31 | 700 | 0.99881 | 0.04802 | −0.00907 |

TABLE 13

| | λ | S1 | S2 | S3 |
|---|---|---|---|---|
| 1 | 400 | 0.53774 | 0.82897 | 0.15378 |
| 2 | 410 | 0.34971 | 0.75472 | 0.55507 |
| 3 | 420 | 0.05436 | 0.52846 | 0.84721 |
| 4 | 430 | −0.39621 | 0.17106 | 0.90209 |
| 5 | 440 | −0.82561 | −0.21949 | 0.51981 |
| 6 | 450 | −0.88446 | −0.46511 | −0.03748 |
| 7 | 460 | −0.55369 | −0.5683 | −0.60866 |
| 8 | 470 | −0.06254 | −0.57175 | −0.81804 |
| 9 | 480 | 0.31581 | −0.56488 | −0.76235 |
| 10 | 490 | 0.60655 | −0.54859 | −0.57545 |
| 11 | 500 | 0.73784 | −0.54841 | −0.3935 |
| 12 | 510 | 0.81333 | −0.53845 | −0.22038 |
| 13 | 520 | 0.85071 | −0.52333 | −0.04926 |
| 14 | 530 | 0.87049 | −0.48033 | 0.10738 |
| 15 | 540 | 0.8395 | −0.4483 | 0.30702 |
| 16 | 550 | 0.74043 | −0.42972 | 0.51683 |
| 17 | 560 | 0.5645 | −0.42946 | 0.70491 |
| 18 | 570 | 0.3268 | −0.44215 | 0.83529 |
| 19 | 580 | 0.02772 | −0.46979 | 0.88234 |
| 20 | 590 | 0.2462 | −0.49491 | 0.83334 |
| 21 | 600 | −0.47901 | −0.5181 | 0.70861 |
| 22 | 610 | −0.69623 | −0.52041 | 0.49441 |
| 23 | 620 | −0.82887 | −0.49321 | 0.26403 |
| 24 | 630 | −0.88838 | −0.45898 | 0.0112 |
| 25 | 640 | −0.89386 | −0.38936 | −0.2223 |
| 26 | 650 | −0.82715 | −0.31074 | 0.46825 |
| 27 | 660 | −0.7258 | −0.22853 | −0.64884 |
| 28 | 670 | −0.57703 | −0.11464 | −0.80864 |
| 29 | 680 | −0.40853 | −0.01899 | 0.91255 |
| 30 | 690 | −0.22953 | 0.09255 | −0.96889 |
| 31 | 700 | −0.04365 | 0.19247 | −0.98033 |

In accordance with the present invention, a color liquid crystal display apparatus wherein each pixel can provide a substantially achromatic color display without using color filters when a voltage is not applied or low voltage is applied, and the each pixel can provide a color display of red, blue or green when a voltage of certain level is applied, can be realized. Further, the color display apparatus is of a low power consumption rate, is easy to carry and presents a bright display. In particular, when the apparatus is used as a reflection type, an extremely large effect is obtainable.

When the apparatus is used as a transmitting type, it is preferable to cover the background portion other than pixels with light shielding films such as printing. Further, the apparatus improves contrast of colors.

Further, when a reflecting film of silver is used, efficiency of utilization of light can be further improved since the reflectance of the film is about 20% better than aluminum. Wavelength dependence of light reflected by silver is different from that by aluminum. Generally, silver provides a low reflectance in a wavelength region of blue, and the color of reflected light is yellowish. By shifting a display of the liquid crystal cell to a blue color side on the chromaticity diagram, the display characteristics can be improved as a whole. Further, a display of bright and good color purity can be obtained.

The liquid crystal display element of the present invention can be utilized as a functioning element for a display device such as a personal computer, a word processor, a fish finder, an instrumental panel for an automobile, a data accessing terminal, an information display device for industrial use (for instance, to display an operation mode in the operation panel of a copy machine (when a copy is in a red tone, the number of pages is indicated by green, lines are indicated by blue and the background is indicated by white) or to display an operation mode for a power machine (the background color is indicated by white, a state of operation is indicated by green and a display of emergency is indicated by red), a dot matrix display device for domestic use (e.g. an audio device, a watch, a game device, amusement device, a telecommunication device, a navigator for automobile, a camera, a telephone with TV, an electronic calculator etc.).

In particular, the color liquid crystal display apparatus of the present invention can be of a low power consumption rate. Accordingly, when it is used for a potable electronic devices such as a potable telephone, an electronic note, an electronic book, an electronic dictionary, a PDA (a potable data accessing terminal), a pager (pocket bell), it provides high performance as well as high visibility and representation. The present invention can be applied to various purposes of use as far as the effect of the present invention is not reduced.

We claim:

1. A color liquid crystal display apparatus comprising:
    a liquid crystal layer of a nematic liquid crystal having positive dielectric anisotropy and including a chiral material, which is interposed between two substrates disposed substantially in parallel to each other, each provided with a transparent electrode and an aligning layer wherein the twist angle of the liquid crystal layer by the orientation of liquid crystal molecules determined by the aligning layer of each of the substrates is 160°–300°;
    a pair of polarizing plates disposed outside the liquid crystal layer, and
    a driving circuit for applying a driving voltage across the transparent electrodes, wherein in said color liquid crystal display device comprising:
    a birefringent plate is disposed between the liquid crystal layer and either one of the pair of polarizing plates;
    in the two substrates, the substrate adjacent to the birefringent plate is a first substrate and the other is a second substrate, and a product $\Delta n_1 \cdot d_1$ of a refractive index anisotropy $\Delta n_1$ of the liquid crystal in the liquid crystal layer and a thickness $d_1$ of the liquid crystal layer is 1.2 μm–2.5 μm;
    the birefringent plate is so formed as to have a relation of $n_X \geq n_Z \geq n_Y$ wherein $n_X$ and $n_Y$ respectively represent a refractive index ($n_X > n_Y$) in the direction of film plane of the birefringent plate, and $n_z$ represents a refractive index in the direction of thickness of the birefringent plate (except for a case of $n_x = n_z = n_y$);
    in the birefringent plate, a sum $\Delta n_2 \cdot d_2$ of the refractive index anisotropy between a slow axis (a direction of $n_x$ in the film plane) and a fast axis (a direction of $n_Y$ in the film plane), and a birefringence in the vertical direction corresponding to the thickness is 1.2 μm–2.5 μm;
    at least three kinds of voltage values are selected so as to be applied across the transparent electrodes by multiplexing driving; and
    development of color of white is effected by applying an OFF voltage.

2. A color liquid crystal display apparatus according to claim 1, wherein the twist angle of the liquid crystal layer is 160°–260°;
    an angle $\theta_2$ formed by the slow axis and the orientation of liquid crystal molecules at the first substrate side is 75°–10°;
    an angle $\theta_1$ formed by a polarizing axis or an absorbing axis of the polarizing plate at the first substrate side and the orientation of the above-mentioned liquid crystal molecules is 120°–165°; and
    an angle $\theta_3$ formed by a polarizing axis or an absorbing axis of the polarizing plate at the second substrate side and the orientation of liquid crystal molecules at the second substrate side is 115°–155°.

3. A color liquid crystal display apparatus according to claim 1, wherein the twist angle of the liquid crystal layer is 220°–260°.

4. A color liquid crystal display apparatus according to claim 1, wherein a relation of $\Delta n_1 \cdot d_1 \leq \Delta n_2 \cdot d_2$ is satisfied.

5. A color liquid crystal display apparatus according to any one of claims 1 through 4, wherein the twist angle of the liquid crystal layer is 220°–260°, $\Delta n_1 \cdot d_1$ is 1.3 μm–1.8 μm and $\Delta n_2 \cdot d_2$ is 1.4 μm–1.9 μm;

an angle $\theta_2$ formed by the slow axis and the orientation of liquid crystal molecules at the first substrate side is 75°–110°; an angle $\theta_1$ formed by a polarizing axis or an absorbing axis of the polarizing plate at the first substrate side and the orientation of the above-mentioned liquid crystal molecules is 120°–165°, and an angle $\theta_3$ formed by a polarizing axis or an absorbing axis of the polarizing plate at the second substrate side and the orientation of liquid crystal molecules at the second substrate side is 120°–150°.

6. A color liquid crystal display apparatus according to claim 1, wherein when values of $\Delta n_1 \cdot d_1$ and $\Delta n_2 \cdot d_2$ used in combination are expressed by vectors of ($\Delta n_1 \cdot d_1$ and $\Delta n_2 \cdot d_2$), $\Delta n_1 \cdot d_1$ and $\Delta n_2 \cdot d_2$ are selected from a region surrounded by $L_1$ (1.3, 1.4), $L_2$ (1.4, 1.4), $L_3$ (1.3, 1.5), $L_4$ (1.75, 1.75), $L_5$ (1.75, 1.85) and $L_6$ (1.65, 1.85).

7. A color liquid crystal display apparatus according to claim 1, 2 or 3, wherein the twist angle of the liquid crystal layer is 230°–250°, $\Delta n_1 \cdot d_1$ is 1.3 μm–1.4 μm and $\Delta n_2 \cdot d_2$ is 1.4 μm–1.5 μm;

an angle $\theta_2$ formed by the slow axis and the orientation of liquid crystal molecules at the first substrate side is 90°–100°; an angle $\theta_1$ formed by a polarizing axis or an absorbing axis of the polarizing plate at the first substrate side and the orientation of the above-mentioned liquid crystal molecules is 130°–150°, and an angle $\theta_3$ formed by a polarizing axis or an absorbing axis of the polarizing plate at the second substrate side and the orientation of liquid crystal molecules at the second substrate side is 125°–145°.

8. A color liquid crystal display apparatus according to claim 1, 2 or 3, wherein the twist angle of the liquid crystal layer is 230°–250°, $\Delta n_1 \cdot d_1$ is 1.65 μm–1.75 μm and $\Delta n_2 \cdot d_2$ is 1.75 μm–1.85 μm;

an angle $\theta_2$ formed by the slow axis and the orientation of liquid crystal molecules at the first substrate side is 85°–105°; an angle $\theta_1$ formed by a polarizing axis or an absorbing axis of the polarizing plate at the first substrate side and the orientation of the above-mentioned liquid crystal molecules is 140°–160°, and an angle $\theta_3$ formed by a polarizing axis or an absorbing axis of the polarizing plate at the second substrate side and the orientation of liquid crystal molecules at the second substrate side is 125°–145°.

9. A color liquid crystal display apparatus according to claim 1, wherein the twist angle of the liquid crystal layer is 230°–250°, $\Delta n_1 \cdot d_1$ is 1.9 μm–2.1 μm and $\Delta n_2 \cdot d_2$ is 2.0 μm–2.2 μm;

the angle $\theta_2$ formed by the slow axis and the orientation of liquid crystal molecules at the first substrate side is 85°–105°; the angle $\theta_1$ formed by the polarizing axis or the absorbing axis of the polarizing plate at the first substrate side and the orientation of the above-mentioned liquid crystal molecules is 130°–150°, and the angle $\theta_3$ formed by the polarizing axis or the absorbing axis of the polarizing plate at the second substrate side and the orientation of liquid crystal molecules at the second substrate side is 125°–145°.

10. A color liquid crystal display apparatus according to any one of claims 1 through 4, wherein the twist angle of the liquid crystal layer is 230°–250°, $\Delta n_1 \cdot d_1$ is 1.7 μm–1.85 μm and $\Delta n_2 \cdot d_2$ is 1.75 μm–1.95 μm;

an angle $\theta_2$ formed by the slow axis and the orientation of liquid crystal molecules at the first substrate side is 85°–105°;

an angle $\theta_1$ formed by a polarizing axis or an absorbing axis of the polarizing plate at the first substrate side and the orientation of the above-mentioned liquid crystal molecules is 140°–160°, and an angle $\theta_3$ formed by a polarizing axis or an absorbing axis of the polarizing plate at the second substrate side and the orientation of liquid crystal molecules at the second substrate side is 125°–145°.

11. A color liquid crystal display apparatus according to claim 1, wherein the refractive index of the birefringent plate satisfies the following formula 1:

$$0.7 \geq N_Z = (n_X - n_Z)/(n_X - n_Y) \geq 0.2.$$

12. A color liquid crystal display apparatus according to claim 1, wherein the driving circuit is capable of multiplexing driving at a high duty ratio of 1/64 or more.

13. A color liquid crystal display apparatus according to claim 1, wherein the driving circuit is capable of multiplexing driving at a high duty ratio of 1/100 or more.

14. A color liquid crystal display apparatus according to claim 1, wherein the driving circuit is capable of multiplex driving at a high duty ratio of 1/200 or more.

15. A color liquid crystal display apparatus according to claim 1, wherein in determination of a predetermined level of effective voltage, the application of an OFF waveform, or the application of an ON waveform, or the application of frames of ON waveform and frames of OFF waveform in a mixed state is selected in multiplexing driving, whereby at least 4 kinds of effective voltage can be applied.

16. A color liquid crystal display apparatus according to claim 1, wherein $\Delta n$ of the liquid crystal used is 0.20 or more and the viscosity η is 17 cSt or less.

17. A color liquid crystal display apparatus according to claim 1, wherein a reflecting plate is disposed at the outside of either one of the pair of polarizing plates.

18. A color liquid crystal display apparatus according to claim 1, wherein at least four color development including pinkish red is provided.

19. A display apparatus wherein the color liquid crystal display apparatus defined in claim 1 is used whereby a red color is developed by applying a certain voltage, and the pinkish red color is used for a display for drawing attention.

20. A display apparatus wherein the color liquid crystal display apparatus defined in claim 17 is used for a potable electronic apparatus.

21. A display apparatus wherein the color liquid crystal display apparatus defined in claim 12, is used so as to provide a dot matrix display suitable for displaying a graph.

* * * * *

UNITED STATES PATENT AND TRADEMARK OFFICE
CERTIFICATE OF CORRECTION

PATENT NO. : 5,986,732
DATED : November 16, 1999
INVENTOR(S) : Masao OZEKI, et al It is certified that error appears in the above-identified patent and that said Letters Patent is hereby corrected as shown below:

On the title page, item [45] should be:

-- [45]  Date of Patent:   *Nov. 16, 1999--

On the title page, the Continued Prosecution Application information has been omitted. It should read as follows::

-- [*]    Notice:      This patent issued on a continued prosecution application filed under 37 CFR 1.53(d), and is subject to the twenty year patent term provisions of 35 U.S.C. 154(a)(2). --

Signed and Sealed this

Ninth Day of January, 2001

Attest:

Q. TODD DICKINSON

*Attesting Officer*   *Commissioner of Patents and Trademarks*